United States Patent
Fujihashi

(10) Patent No.: US 9,674,473 B2
(45) Date of Patent: Jun. 6, 2017

(54) IMAGE PICKUP APPARATUS, ELECTRONIC DEVICE, CONTROL METHOD, AND CAMERA SYSTEM

(71) Applicant: CANON KABUSHIKI KAISHA, Tokyo (JP)

(72) Inventor: Naoto Fujihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 14/662,051

(22) Filed: Mar. 18, 2015

(65) Prior Publication Data

US 2015/0281622 A1    Oct. 1, 2015

(30) Foreign Application Priority Data

Mar. 25, 2014 (JP) ................. 2014-061487

(51) Int. Cl.
*H04N 5/376* (2011.01)
*H04N 5/04* (2006.01)
*H04N 5/232* (2006.01)
*H04N 5/225* (2006.01)

(52) U.S. Cl.
CPC ............ *H04N 5/3765* (2013.01); *H04N 5/04* (2013.01); *H04N 5/2256* (2013.01); *H04N 5/23203* (2013.01); *H04N 5/23241* (2013.01); *H04N 5/23245* (2013.01)

(58) Field of Classification Search
CPC .... H04N 5/3765; H04N 5/04; H04N 5/23241; H04N 5/23203; H04N 5/2256; H04N 5/23245
See application file for complete search history.

(56) References Cited

U.S. PATENT DOCUMENTS

| 5,122,880 A | 6/1992 | Nagano |
| 6,002,436 A | 12/1999 | Anderson |
| 7,085,595 B2 | 8/2006 | Kitchin |
| 7,339,620 B1 * | 3/2008 | Yamagishi ......... H04N 5/23212 348/220.1 |

(Continued)

FOREIGN PATENT DOCUMENTS

| CN | 102625423 A | 8/2012 |
| JP | S63-172137 A | 7/1988 |

(Continued)

*Primary Examiner* — Padma Haliyur
(74) *Attorney, Agent, or Firm* — Canon U.S.A., Inc. IP Division

(57) ABSTRACT

An electronic device including a communication unit that can communicate with an image pickup apparatus, a state change unit that can change an operation state of the electronic device to an activation state and a power saving state, and a timing calculation unit that calculates an activation timing for starting an operation for changing the operation state of the electronic device, in which the timing calculation unit calculates the activation timing on the basis of information related to a timing for picking up the image of the subject which is received via the communication unit, the state change unit starts the operation for changing the operation state of the electronic device from the activation state to the power saving state after the activation timing is calculated and starts the operation for changing this operation state from the power saving state to the activation state at the activation timing.

21 Claims, 11 Drawing Sheets

(56) References Cited

U.S. PATENT DOCUMENTS

| | | | |
|---|---|---|---|
| 7,689,840 B2 * | 3/2010 | Mizutani | G03B 7/26 |
| | | | 348/372 |
| 7,844,265 B2 | 11/2010 | Kuchibhotla | |
| 8,195,040 B2 * | 6/2012 | Shirakawa | G03B 15/05 |
| | | | 396/56 |
| 8,326,141 B1 | 12/2012 | Clark | |
| 2002/0064384 A1 | 5/2002 | Kawasaki | |
| 2003/0133018 A1 | 7/2003 | Ziemkowski | |
| 2005/0062877 A1 | 3/2005 | Yuyama | |
| 2008/0175580 A1 | 7/2008 | Kita | |
| 2008/0298792 A1 | 12/2008 | Clark | |
| 2009/0251601 A1 | 10/2009 | Ihlefeld | |
| 2010/0008658 A1 | 1/2010 | King | |
| 2011/0063462 A1 | 3/2011 | Koike | |
| 2011/0268002 A1 | 11/2011 | Liu | |
| 2012/0045193 A1 | 2/2012 | King | |
| 2012/0194683 A1 | 8/2012 | Goldberg | |
| 2012/0307029 A1 | 12/2012 | Nambakam | |
| 2013/0169861 A1 | 7/2013 | Yoshino | |

FOREIGN PATENT DOCUMENTS

| | | |
|---|---|---|
| TW | 200740089 A | 10/2007 |
| WO | 02/30108 A1 | 4/2002 |

* cited by examiner

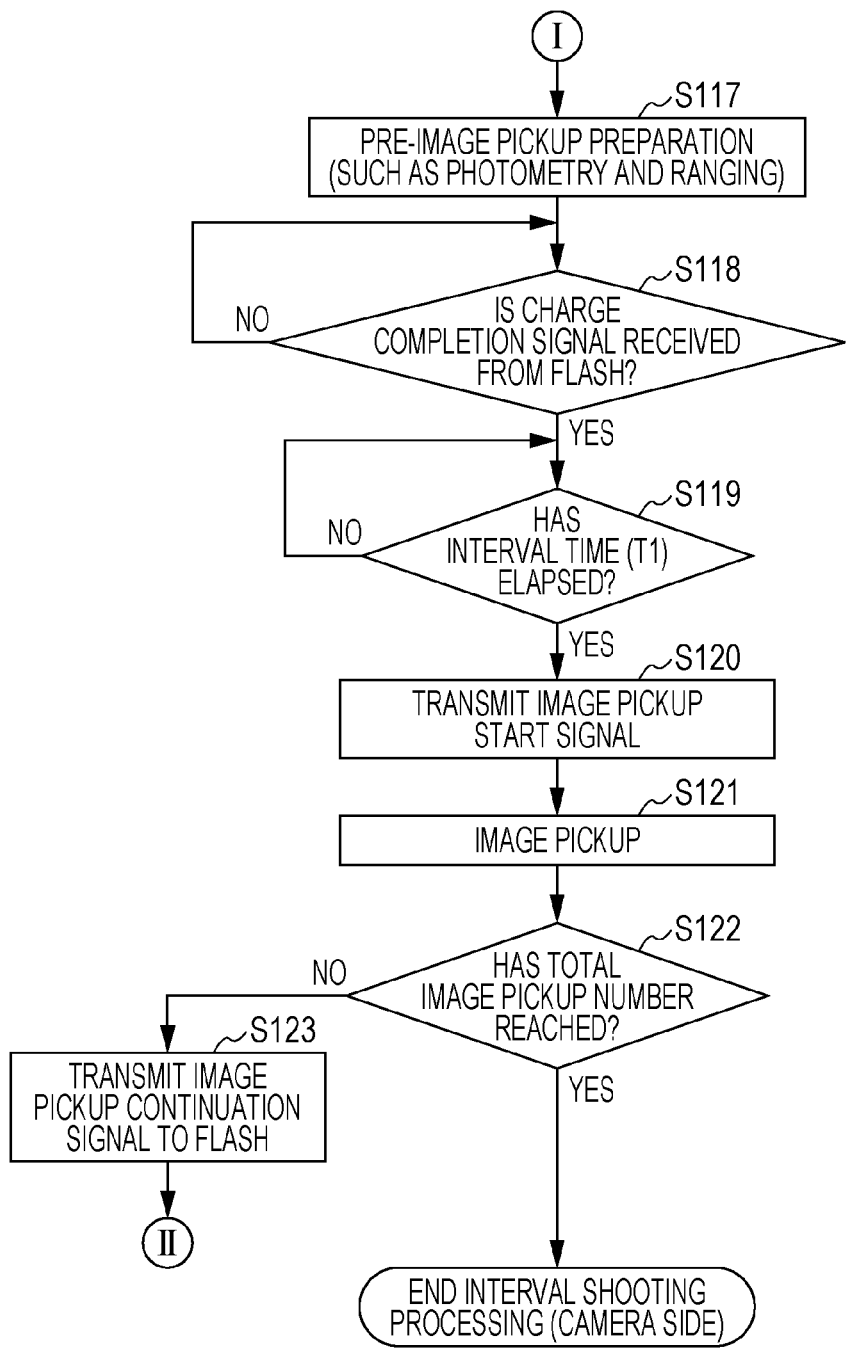

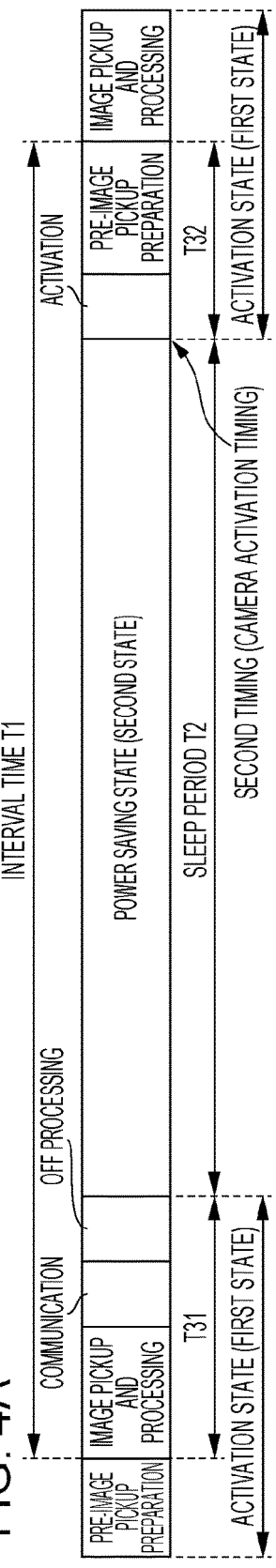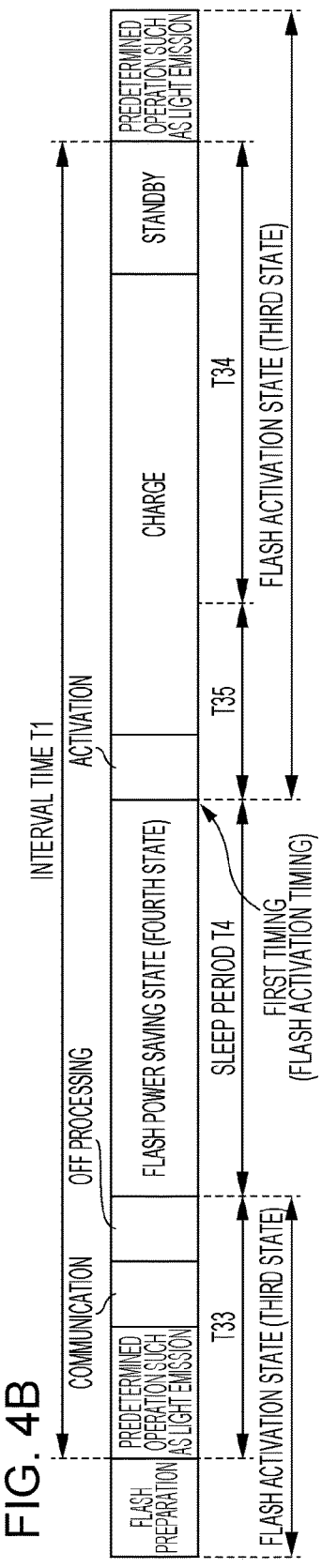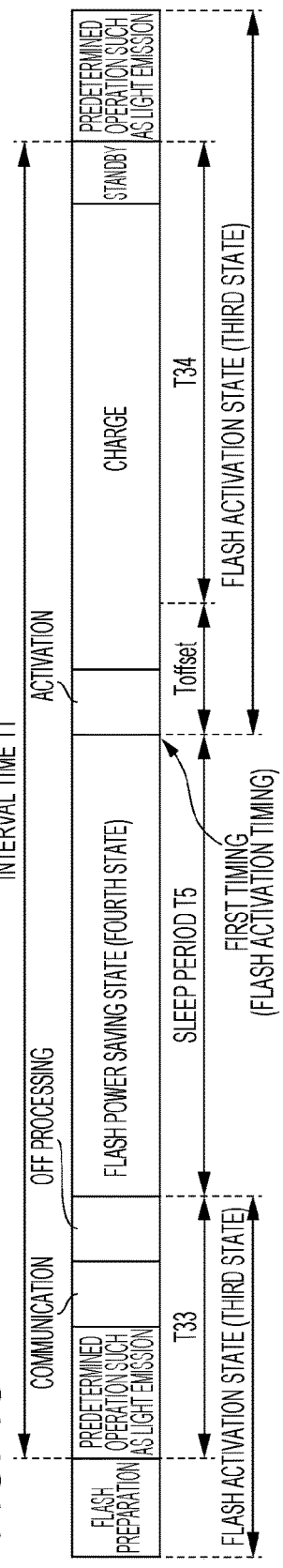

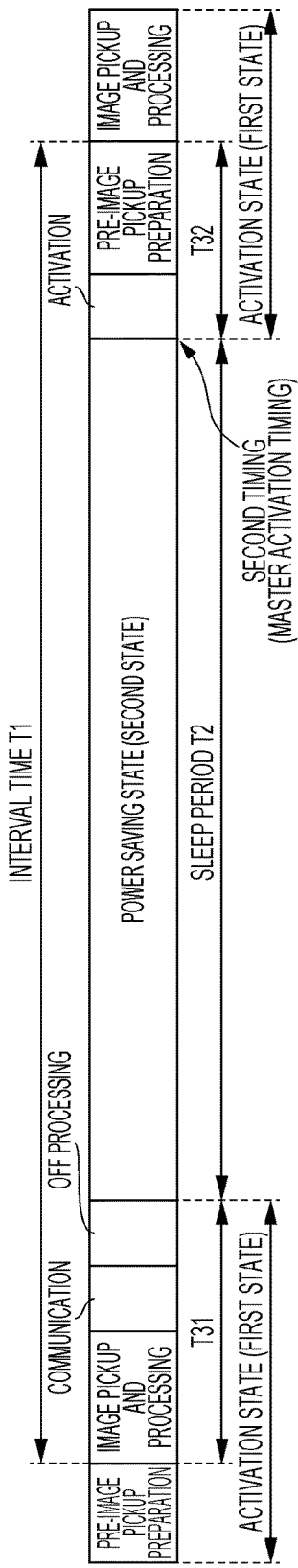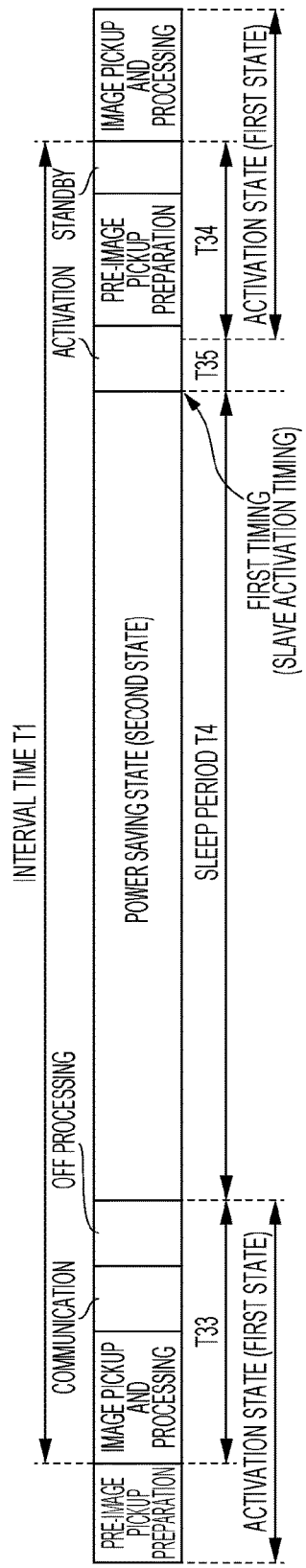

IMAGE PICKUP APPARATUS, ELECTRONIC DEVICE, CONTROL METHOD, AND CAMERA SYSTEM

BACKGROUND OF THE INVENTION

Field of the Invention

The present invention relates to an image pickup apparatus that can pick up an image of a subject at a set time, an electronic device that can communicate with the image pickup apparatus, a control method, and a camera system.

Description of the Related Art

Up to now, an image pickup apparatus such as a digital camera which is configured to pick up an image of a subject at a set time has been proposed. This image pickup apparatus includes a digital camera that can perform so-called interval shooting to continuously pick up images of the subject at a set time interval or the like. Japanese Patent Laid-Open No. 63-172137 discloses a control apparatus configured to suppress, in a case where the interval shooting is performed by causing a flash apparatus to emit light, energy consumption during the interval shooting by performing a power supply control of the flash apparatus on the basis of a charge time of the flash apparatus.

SUMMARY OF THE INVENTION

An aspect of the claimed invention relates to an electronic device including: a communication unit that can communicate with an image pickup apparatus; a state change unit that can change an operation state of the electronic device to a first state in which an operation corresponding to an image pickup of a subject by the image pickup apparatus can be performed and a second state in which power consumption is lower than power consumption in the first state; and a timing calculation unit that calculates an activation timing for starting an operation for changing the operation state of the electronic device from the second state to the first state by the state change unit, in which the timing calculation unit calculates the activation timing on the basis of information related to a timing for picking up the image of the subject by the image pickup apparatus which is received from the image pickup apparatus via the communication unit, the state change unit starts the operation for changing the operation state of the electronic device from the first state to the second state after the activation timing is calculated by the timing calculation unit, and the state change unit starts the operation for changing the operation state of the electronic device from the second state to the first state at the activation timing.

According to the claimed invention, it is possible to suppress the power consumption of the image pickup apparatus in a case where the image of the subject is picked up at the set time.

Further features of the present invention will become apparent from the following description of embodiments with reference to the attached drawings.

BRIEF DESCRIPTION OF THE DRAWINGS

FIG. 3A and FIG. 3B are flow charts for describing interval shooting processing in the digital camera functioning as the image pickup apparatus according to the first embodiment for carrying out the present invention.

FIG. 4A, FIG. 4B, and FIG. 4C are timing charts related to operations of the digital camera functioning as the image pickup apparatus according to the first embodiment for carrying out the present invention and the flash.

FIG. 9A and FIG. 9B are timing charts related to operation of the digital camera functioning as the image pickup apparatus according to the second embodiment for carrying out the present invention.

DESCRIPTION OF THE EMBODIMENTS

Each of the embodiments of the present invention described below can be implemented solely or as a combination of a plurality of the embodiments or features thereof where necessary or where the combination of elements or features from individual embodiments in a single embodiment is beneficial.

First Embodiment

Figure 1:
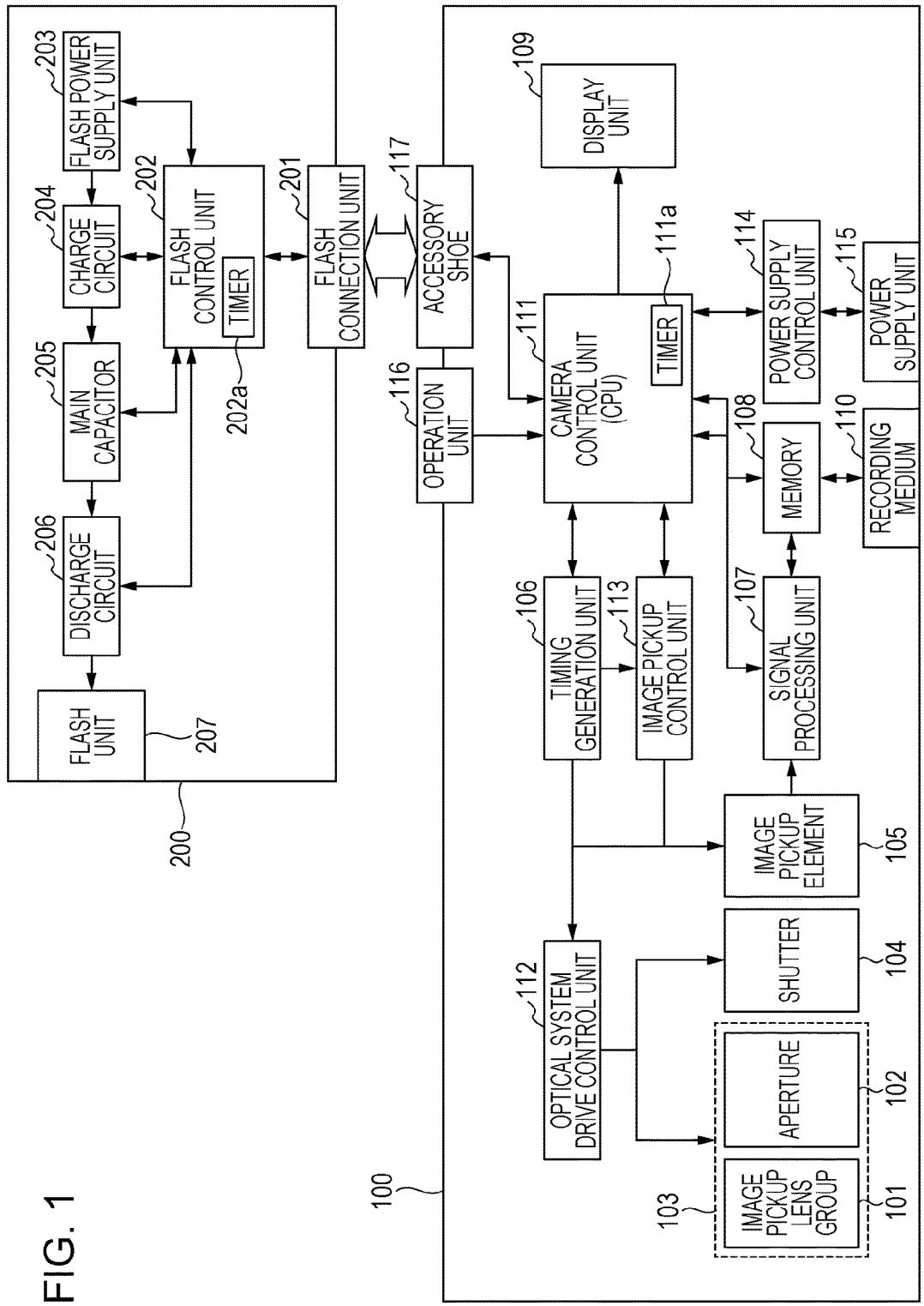
FIG. 1 is a block diagram for describing configurations of a digital camera functioning as an image pickup apparatus according to a first embodiment for carrying out the present invention and a flash.

A digital camera (hereinafter, will be simply referred to as camera) 100 functioning as an image pickup apparatus according to a first embodiment of the present invention and a flash 200 will be described with reference to FIGS. 1 to 5. Hereinafter, a basic configuration of the camera 100 will be described with reference to FIG. 1. FIG. 1 is a block diagram for describing configurations of the camera 100 functioning as the image pickup apparatus according to the first embodiment for carrying out the present invention and the flash 200 functioning as a light emitting apparatus. It is noted that the flash 200 is detachably attached to the camera 100.

An image pickup lens group 101 is a lens group constituted by a plurality of lenses including an optical axis shift lens, a zoom lens, and a focus lens. An aperture 102 is a light amount adjustment member configured to adjust the amount of transmitted light in the image pickup lens group 101. According to the present embodiment, the image pickup lens group 101 and the aperture 102 are collectively referred to as an image pickup optical system 103. It is noted that the camera 100 according to the present embodiment is a so-called lens replacement type digital camera in which a lens barrel provided to the image pickup optical system 103 can be detached from a camera main body, but a configuration in which the camera main body and the lens barrel are provided in an integrated manner may also be adopted.

A shutter 104 and an image pickup element 105 are provided in a subsequent stage of the image pickup optical system 103. In a case where the shutter 104 is in an open state, an optical image of a subject which is guided by the image pickup optical system 103 is imaged on the image pickup element 105. On the other hand, in a case where the shutter 104 is in a closed state, light guided from the image pickup optical system 103 is shielded from the image pickup element. The image pickup element 105 is exposed with light for a set exposure time by controlling opening and closing operations of the shutter 104. It is noted that the present embodiment relates to the configuration for picking up the image of the subject for the set exposure time on the basis of the operations for opening and closing the shutter 104, but a configuration for picking up the image of the subject for the set exposure time on the basis of a so-called electronic shutter system may also be adopted.

The image pickup element 105 is a charge accumulation type image pickup element constituted by a solid-state image pickup element such as a CCD or a CMOS which can generate an image by accumulating the electric charges, and pixels for the image pickup are two-dimensionally arranged. When the optical image of the subject is formed on the image pickup element 105, an analog electric signal (analog image data) in accordance with the optical image of the subject is output. An analog front end (AFE) which is not illustrated in the drawing is connected to the image pickup element 105. The AFE performs an adjustment on a gain amount with respect to the analog image data output from the image pickup element 105, sampling, and the like in accordance with an instruction from a camera control unit 111 which will be described below.

It is noted that in the camera 100 according to the present embodiment, the image pickup element 105 and the AFE are collectively set as the image pickup unit, but the configuration is not limited to this. A configuration in which the respective units that perform the operation for picking up the image of the subject are collectively set as the image pickup unit may also be adopted. In addition, a configuration in which a single body of the image pickup element 105 is set as the image pickup unit may be adopted.

A timing generation unit 106 is configured to generate timings at which various signals are supplied to the camera 100 and the flash 200. According to the present embodiment, the timing generation unit 106 transmits the timings at which clock signals and control signals are supplied to the image pickup element 105 and also to an optical system drive control unit 112, an image pickup control unit 113, a flash control unit 202, and the like which will be described below.

A signal processing unit 107 is a processing unit configured to perform resize processing such as a predetermined pixel interpolation or reduction, color conversion process, photometry calculation, calculation processing for a ranging control, and the like on the image data output from the image pickup element 105. In addition, the signal processing unit 107 can also perform automatic white balance (AWB) processing of a through the lens system (TTL), autofocus (AF) processing, and auto exposure (AE) processing. Furthermore, the signal processing unit 107 is provided with an analog-to-digital (A/D) conversion unit, and a conversion of the analog image data output from the image pickup element 105 into digital image data is performed. Furthermore, the signal processing unit 107 also performs an adjustment on a gain amount with respect to the converted digital image data.

A memory 108 is a memory that can electrically perform deletion and storage and includes, for example, an EEPROM or the like which is represented by a flash memory or the like. The memory 108 stores various data used in the present embodiment. For example, programs executed in the camera 100, constants for the operations, and various exposure conditions, as well as calculation expressions and exposure conditions used in the processings in the camera 100, information related to a model (type) of the flash 200, and the like are stored in the memory 108. It is noted that the programs executed in the camera 100 refer to programs for instructing operations similar to flows illustrated in FIGS. 3A and 3B and FIG. 5 which will be described below.

The memory 108 also includes a recording area for the image data which is constituted by a recording element such as a DRAM. The memory 108 is provided with a sufficient storage capacity where a predetermined number of still images, a predetermined time of moving images, and audio data can be recorded, and recording of the obtained digital image data can be realized. Furthermore, the memory 108 is also used as an image display memory (video memory), a work area for the camera control unit 111, and a recording buffer for a recording medium 110 which will be described below. The digital image data recorded in the memory 108 is converted into analog image data for the display by a digital-to-analog (D/A) conversion unit that is not illustrated in the drawing and transmitted to a display unit 109 constituted by an LCD or the like. Subsequently, the display unit 109 displays the received analog image data for the display in response to an instruction from the camera control unit 111. While this analog image data for the display is consecutively displayed on the display unit 109, live view display of the image data obtained by picking up the image of the subject can be performed. It is noted that not only the display unit 109 but also an electronic viewfinder that is not illustrated in the drawing can display this live view. Furthermore, according to the present embodiment, preview display of the analog image data for the display is performed on the display unit 109 when this image data is obtained.

The recording medium 110 is a recording medium such as a memory card or a hard disc drive that can record the digital image data recorded in the memory 108. According to the present embodiment, while a lid part that is not illustrated in the drawing which can be opened and closed is provided to an outer package of the camera 100 in an opened state, the recording medium 110 can be inserted into and removed from an inner part of the main body of the camera 100. Subsequently, the recording medium 110 can communicate with the camera control unit 111 in a state in which the recording medium 110 is inserted into the inner part of the main body of the camera 100. It is noted that the recording medium 110 is not limited to the memory card or the like that can be inserted into and removed from the camera 100 and may be an optical disc such as a DVD-RW disc or a magnetic disc such as the hard disc drive. Furthermore, a configuration in which the recording medium 110 is previously built in the camera 100 may be adopted instead of the detachable recording medium 110.

A camera control unit (hereinafter, will be simply referred to as CPU) 111 controls the entire operation of the camera 100 in an overall manner. For example, the CPU 111 instructs controls on the respective operations in the camera 100 with respect to the timing generation unit 106, the signal processing unit 107, the memory 108, and the optical system drive control unit 112 as well as the image pickup control unit 113, the power supply control unit 114, and the like which will be described below. It is noted that the CPU 111 executes the program stored in the memory 108 and can also control the operation in accordance with the processing of this program within the camera 100. The CPU 111 also functions as a communication control unit configured to control transmission and reception of various signals with respect to an electronic device connected to the camera 100. The CPU 111 is also provided with a built-in timer (second measurement unit) 111a that can measures a time. The built-in timer 111a can measure a time related to the operation of the camera 100. It is noted that the built-in timer 111a according to the present embodiment measures a time until the next image pickup in a case where the shooting mode of the camera 100 is the interval shooting mode (first mode) on the basis of an interval time T1. It is noted that the interval shooting mode refers to a shooting mode for continuously picking up images of the subject at a previously set time interval. The interval time T1 indicates a time interval from the start of the image pickup of the subject until the start of the next image pickup in a case where the camera 100 is set in the interval shooting mode. Shooting modes that can be set in the camera 100 and the flash 200 according to the present embodiment will be described below.

The optical system drive control unit 112 is an optical system drive control unit configured to control the drive of the image pickup lens group 101 and the aperture 102 in accordance with the instruction from the CPU 111. The image pickup control unit 113 is an exposure control unit configured to instruct an adjustment on the gain amount with respect to the analog image data (setting of an ISO speed rating) and control an exposure time of the image pickup element 105 (control of the accumulation of the electric charges and the readout) in accordance with the instruction from the CPU 111.

A power supply unit 115 is a primary battery such as an alkaline battery or lithium (Li) battery, a secondary battery such as a nickel cadmium (NiCd) battery, nickel metal hydride (NiMH) battery, or Li battery, an AC adapter, or the like and supplies electric power to a power supply control unit 114. The power supply control unit 114 is constituted by a DC-DC converter, a switch circuit configured to switch an energization block, and the like. Subsequently, the power supply control unit 114 detects the presence or absence of the attachment of the battery, a type of the battery, a battery remaining amount, or the like in the power supply unit 115 to control the DC-DC converter on the basis of the detection result and the instruction of the CPU 111 and supplies necessary voltages to the respective units of the camera 100 for necessary periods.

An operation unit 116 is an input device group constituted by operation members such as a switch, a button, or a dial for the user to perform various instructions and settings with respect to the camera 100. For example, the operation unit 116 includes a power supply switch, a release button, a menu button, a direction button, an execution button, and the like. The operation unit 116 is also provided with a mode setting switch. While this mode setting switch is operated by the user, an arbitrary shooting mode is set. It is noted that the camera 100 and the flash 200 according to the present embodiment can set the interval shooting mode (first mode) for continuously picking up images of the subject at a set time interval and a normal shooting mode (second mode) for picking up an image of the subject once.

Specifically, the user operates the mode setting switch and selects the interval shooting mode or the normal shooting mode. A CPU (first mode setting unit) 111 sets a shooting mode of the camera 100 in accordance with the shooting mode selected by the user. The CPU 111 also transmits information related to the shooting mode set in the camera 100 to the flash control unit 202 of the flash 200 which will be described below. The flash control unit (second mode setting unit) 202 sets a shooting mode of the flash 200 on the basis of the information related to the shooting mode which is received from the CPU 111. As described above, the present embodiment relates to the configuration in which the shooting mode of the flash 200 is automatically set (changed) in conjunction with the setting of the shooting mode on the camera 100 side. It is noted that a configuration in which shooting modes are independently set on the camera 100 side and the flash 200 side may also be adopted.

The setting of the shooting mode may be performed by the user at an arbitrary timing in a state in which a power supply of the camera 100 is on. In the following description of the interval shooting mode, the first image pickup is supposed to be performed after the shooting mode of the camera 100 is set as the interval shooting mode.

The following configuration may also be adopted. That is, the display unit 109 is a touch panel of an electrostatic capacitance system, and a user interface displayed on the display unit 109 is operated and selected, so that information input similar to the information input when the operation unit 116 is operated can be realized.

An accessory shoe 117 is an attachment part for detachably attaching an electronic device such as a camera accessory to the camera 100. The electronic device that can be attached to the camera 100 includes a light emission apparatus such as a flash, an electronic viewfinder such as an EVF, a GPS unit, or the like. A first terminal group (first communication unit) 401 which will be described below is provided inside the accessory shoe 117. It is noted that a second terminal group (second communication unit) 402 corresponding to the first terminal group 401 is provided to the flash 200 side which will be described below. While the first terminal group 401 and the second terminal group 402 are electrically connected to each other, the camera 100 and the flash 200 can communicate with each other. The basic configuration of the camera 100 has been described above.

Hereinafter, a basic configuration of the flash 200 functioning as a light emission apparatus according to the present embodiment will be described with reference to FIG. 1. The flash 200 is a light emission apparatus configured to illuminate the subject with light by using a xenon tube, a light emitting diode (LED), or the like as a flash unit 207. In a state in which the accessory shoe 117 of the camera 100 is connected to a flash connection unit 201 of the flash 200, and in a state in which the power supply of the flash 200 is on, the flash 200 and the camera 100 are electrically connected to each other. In this state, the first terminal group 401 on the camera 100 side is connected to the second terminal group 402 on the flash 200 side, so that the CPU 111 and the flash control unit 202 can communicate with each other. A detail of signals communicated between the camera 100 and the flash 200 will be described below with reference to FIG. 2.

When a power supply switch that is and not illustrated in the drawing and provided in an outer package of the flash 200 is turned on, an output voltage that is output from a flash power supply unit 203 is increased to a predetermined voltage by a charge circuit (charge unit) 204 in accordance with the instruction of the flash control unit 202. Subsequently, in a main capacitor 205 is charged with the electric charges corresponding to the output voltage increased to the predetermined voltage by the charge circuit 204. This is the configuration in which the flash control unit 202 of the flash 200 regularly detects the voltage of the main capacitor 205 and automatically resumes the charge at a stage where this voltage becomes lower than or equal to the predetermined voltage.

The flash control unit 202 is a control unit configured to control operations and processings in the respective units of the flash 200 in an overall manner. For example, the flash control unit 202 can control calculation of a flash activation timing which will be described below, change of the operation state of the flash 200, and the like.

The flash control unit 202 also functions as a charge detection unit configured to measure the voltage charged in the main capacitor 205 and detects that a predetermined amount of the electric charges are charged in the main capacitor 205. In a case where the flash control unit 202 detects that the main capacitor 205 is charged with the voltage corresponding to the predetermined amount of the electric charges, a charge completion signal is transmitted from the flash control unit 202 to the CPU 111.

In this state, when the image pickup of the subject is instructed in the camera 100, a signal for instructing to start the light emission is transmitted from the CPU 111 to the flash control unit 202. Subsequently, when the flash control unit 202 receives the above-described signal from the CPU 111, the electric charges charged in the main capacitor 205 are supplied to the flash unit 207 via a discharge circuit 206, and flashlight emission is executed.

The flash control unit 202 of the flash 200 is provided with a built-in timer 202a configured to measure the time in the processing performed in the flash 200 similarly as in the camera 100 side.

In addition, the present embodiment relates to the configuration in which a dimmer calculation processing for calculating a light emission amount of the flash 200 is performed on the basis of the image data obtained by the signal processing unit 107 provided within the camera 100, but the configuration is not limited to this. For example, a configuration in which the flash control unit 202 of the flash 200 obtains luminance information of the subject from the camera 100 side, and the flash control unit 202 performs the dimmer calculation may also be adopted. At this time, a configuration in which a memory that records the calculated light emission amount is newly provided inside the flash 200 may also be adopted. The above-described memory stores flash model information, flash timer accuracy, and the like and temporarily records information obtained in the interval shooting processing which will be described below. Subsequently, the flash control unit 202 appropriately reads out the information stored in the memory, the information recorded in the memory, and the like. The basic configuration of the flash 200 has been described above. With this configuration, it is possible to cause the flash 200 to perform the light emission at the desired light emission amount.

Figure 2:
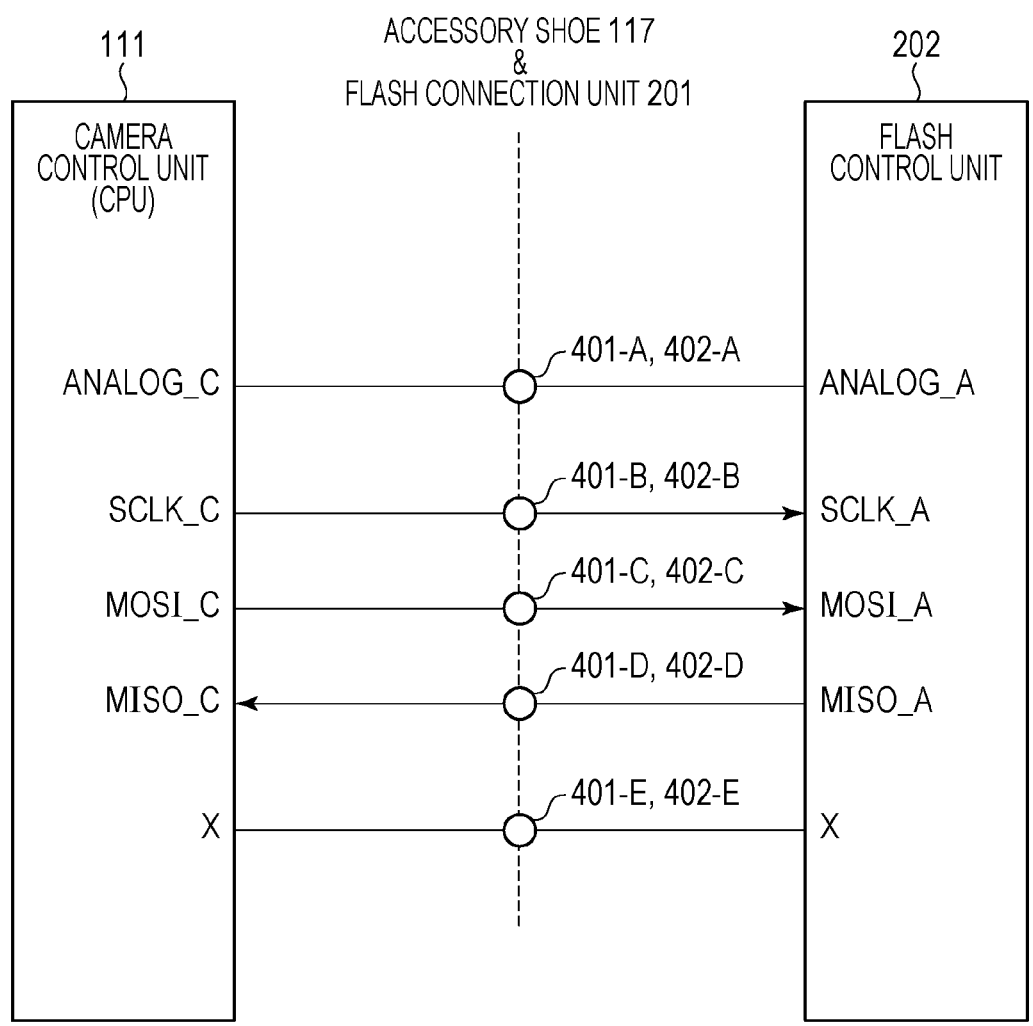
FIG. 2 is a block diagram for describing a configuration of a neighborhood of a part where the digital camera functioning as the image pickup apparatus according to the first embodiment for carrying out the present invention and the flash are connected to each other.

Hereinafter, a detail of the communication performed between the camera 100 and the flash 200 will be described with reference to FIG. 2. FIG. 2 is a block diagram for describing a configuration of a neighborhood of a part where the camera 100 functioning as the image pickup apparatus according to the first embodiment for carrying out the present invention and the flash 200 are connected to each other.

As illustrated in FIG. 2, the accessory shoe 117 of the camera 100 and the flash connection unit 201 of the flash 200 are provided with the first terminal group 401 and the second terminal group 402 as communication units. It is noted that the first terminal group 401 and the second terminal group 402 are each constituted by five terminals including A to E terminals.

The A terminal (401-A, 402-A) is a terminal where an analog information communication is performed between the camera 100 and the flash 200. Herein, the analog information communication is a communication for the camera 100 and the flash 200 to respectively recognize mutual states by detecting analog values such as a voltage value and a current value. For example, while the A terminal changes information related to pre-operation preparation of the flash 200 such as the charge completion in the main capacitor 205 into an analog value, the information can be transmitted from the flash 200 to the camera 100.

The B terminal (401-B, 402-B) is a clock terminal (SCLK) used when a serial communication between the camera 100 and the flash 200 is performed. The C terminal (401-C, 402-C) is a data terminal (MOSI) for performing information transmission from the camera 100 to the flash 200 when the serial communication between the camera 100 and the flash 200 is performed. The D terminal (401-D, 402-D) is a data terminal (MISO) for performing information transmission from the flash 200 to the camera 100 when the serial communication between the camera 100 and the flash 200 is performed. It is noted that the present embodiment relates to the configuration in which the serial communication is performed between the camera 100 and the flash 200 by way of a so-called three-line serial communication using the three terminals including the B terminal, the C terminal, and the D terminal, but the configuration is not limited to the above. For example, a system such as an ICC communication or a UART communication may of course be employed.

The E terminal (401-E, 402-E) is a so-called X terminal for transmitting a signal for instructing to start the light emission from the camera 100 to the flash 200. A timing at which a light emission start signal is transmitted from the camera 100 to the flash 200 is supposed to follow the timing generated by the timing generation unit 106 of the camera 100. For example, in a case where the flash 200 is caused to perform the light emission to pick up the image of the subject or the like, it is possible to cause the flash 200 to perform the light emission in tune with the timing at which the image of the subject is picked up while the flash 200 receives the above-described signal from the camera 100 via the E terminal. A state in which the respective terminal units described above can be electrically connected to each other is established when the flash connection unit 201 of the flash 200 is connected to the accessory shoe 117 of the camera 100 described above in a state in which the power supplies of the camera 100 and the flash 200 are on. The basic configurations of the camera 100 and the flash 200 according to the present embodiment have been described above.

Hereinafter, operations of the camera 100 and the flash 200 in a case where the image of the subject is picked up in a state in which the flash 200 is caused to perform the light emission (so-called flash shooting) will be described. It is noted that, in the following explanation, information such as obtained image (data), an exposure amount, or an evaluation value is recorded in the memory 108 after the information is obtained, and the CPU 111 appropriately executes the readout.

First, the CPU 111 of the camera 100 performs a determination on an electronic device attached to the accessory shoe 117. Specifically, when the power supply on the flash 200 side is turned on in a state in which the flash 200 is attached to the accessory shoe 117, the information related to the model of the flash 200 (flash model information) is transmitted from the flash control unit 202 to the CPU 111. The CPU 111 then identifies that the electronic device attached to the accessory shoe 117 is the flash on the basis of this flash model information.

Next, in a case where the electronic device attached to the accessory shoe 117 is identified as the flash 200, the CPU 111 determines whether or not the flash 200 is a model in which an operation state can be changed on the basis of the flash model information. The operation state that can be changed by the flash 200 according to the present embodiment will be described below.

It is noted that timer accuracy information (first measurement accuracy) of the built-in timer 202a of the flash 200 which functions as the first measurement unit is also transmitted from the flash control unit 202 to the CPU 111.

Next, when the user operates a release button of the operation unit 116 in a state in which the power supply of the camera 100 is on, the CPU 111 determines whether or not the release button is put into an SW1 state (for example, a half-stroke state).

When this determination indicates that the release button is in the SW1 state, the signal processing unit 107 executes focus processing (AF processing) on the basis of the previously obtained image data such as the live view. The AF processing according to the present embodiment includes calculating an AF evaluation value from contrast information of luminance components of the image and setting respective lens positions of the image pickup lens group 101 by the optical system drive control unit 112 on the basis of this AF evaluation value. It is noted that the method of calculating the AF evaluation value is not limited to this method, and other calculation methods may be used.

When it is determined that the release button is in the SW1 state, the signal processing unit 107 performs the photometry calculation on the basis of the previously obtained image data such as the live view. The method for the photometry calculation includes dividing one screen of the image into a plurality of blocks and calculating an average luminance value for each of these blocks. Subsequently, a representative luminance value is calculated by integrating the average luminance values of all the blocks. The present embodiment relates to the configuration in which the subsequent processing is executed while this representative luminance value is set as the luminance information of the subject, but the configuration is not limited to this. For example, a method of calculating the luminance information of the subject by using a photometry method such as spot photometry may of course be employed. That is, any related-art method may be used as the method for calculating the luminance information of the subject which is used in the subsequent processing.

Next, the signal processing unit 107 reads out the previously calculated luminance information of the subject from the memory 108 and sets such an exposure amount that the subject has an appropriate luminance in the camera 100 (AE processing) on the basis of this luminance information. It is noted that the exposure amount according to the present embodiment refers to a value for setting a luminance of the obtained image and is set by changing the exposure conditions such as an aperture value, an exposure time (accumulation time), and a gain amount (ISO speed rating).

Next, the signal processing unit 107 reads out the previously calculated luminance information of the subject and the exposure conditions from the memory 108 and executes the dimmer calculation for calculating the light emission amount of the flash 200. The AF processing described above and the other various processings may be performed in any order, and a configuration in which these processings are respectively performed in parallel may also be adopted. The present embodiment relates to the configuration in which the above-described various processings are performed by using the digital image data obtained by the image pickup element 105, but the configuration is not limited to this. For example, a configuration in which a sensor is newly provided to the camera 100, and the AF processing, the photometry calculation, the AE processing, the dimmer calculation, and the like are performed by using image data obtained by this sensor may also be adopted. The above-described various processings, calculations, and the like correspond to preparation operation before the image pickup in the camera 100 (hereinafter, will be referred to as pre-image pickup preparation).

When the preparation operations before the image pickup in the camera 100 are completed, the CPU 111 determines whether or not the release button of the operation unit 116 is put into an SW2 state (for example, a full-stroke state by the user operation). When the charge completion signal is received from the flash 200 side in a state in which the CPU 111 determines that the release button is in the SW2 state, the image of the subject is picked up by the image pickup element 105, and the analog image data is obtained. Subsequently, the flash control unit 202 of the flash 200 causes the flash unit 207 of the flash 200 to emit the light in tune with the image pickup of the subject by the image pickup element 105 of the camera 100 on the basis of the light emission start signal received from the camera 100 side.

The obtained analog image data is subjected to the above-described various processings by the signal processing unit 107 in a state in which the data is converted into the digital image data by the signal processing unit 107 to be thereafter recorded in the memory 108. This digital image data is read out from the memory 108 by the CPU 111 and converted into the analog image data for the display by the D/A conversion unit that is not illustrated in the drawing to be thereafter displayed on the display unit 109 for quick review. Furthermore, the CPU 111 reads out the digital image data recorded in the memory 108, and this digital image data is recorded in the recording medium 110. The operation when the image of the subject is picked up while the flash 200 is caused to emit the light has been described above.

According to the present embodiment, the case where the release button is shifted to the SW1 state and the SW2 state through the direct operation on the release button of the operation unit 116 by the user has been described, but the configuration is not limited to this. For example, a configuration in which an external release button that is detachable from the camera 100 is attached to the camera 100, and this external release button is operated may also be adopted. In addition, a configuration in which the image of the subject is picked up by remotely operating a portable electronic device such as a smart phone or a tablet terminal in a case where the camera 100 corresponds to a radio communication or a case where an external device for the radio communication is attached to the camera 100 may also be adopted. Furthermore, a configuration in which the image of the subject is automatically picked up in accordance with a previously set time may also be adopted. The basic operations of the camera 100 and the flash 200 in a case where the image of the subject is picked up in a state in which the flash 200 is caused to emit the light have been described above.

Interval Shooting Mode

Hereinafter, a case where the so-called interval shooting for picking up an image of the subject plural times at a set time interval is performed by the camera 100 will be described. It is noted that, in the following explanation, a case where the flash 200 is caused to emit the light when the images of the subject are picked up in a state in which the interval shooting mode for performing the interval shooting is set as the shooting mode of the camera 100 will be described as an example.

In a case where the interval shooting mode is set, the operation state of the camera 100 is changed to a first state (activation state) in which an image of the subject can be picked up and a second state (power saving state) in which the power consumption is lower than that in the first state. Meanwhile, in a case where the interval shooting mode is set, the operation state of the flash 200 is changed to a third state (flash activation state) in which the flash unit 207 can emit the light and a fourth state (flash power saving state) in which the power consumption is lower than that in the third state. It is noted that the operation state of the flash 200 is alternately changed to the flash activation state and the flash power saving state in a case where the interval shooting mode is set.

The flash 200 can perform operation corresponding to the image pickup of the camera 100 in a case where the operation state is the flash activation state. For example, in a case where the flash 200 is in the flash activation state, the flash control unit 202 can cause the flash unit 207 to emit the light.

The present embodiment relates to the configuration in which the operation state of the camera 100 is alternately changed to the activation state and the power saving state in a case where the interval shooting mode is set. Meanwhile, according to this configuration, in a case where the interval shooting mode is set, the operation state of the flash 200 is alternately changed to the flash activation state and the flash power saving state. It is noted that the configuration is not limited to this in a case where the interval time T1 which will be described below is shorter than a predetermined time. This detail will be described below.

In the camera 100 and the flash 200 according to the present embodiment, all operations except for those related to the changes of the respective operation states, such as the time measurements by the built-in timers 111a and 202a, are stopped in the second state and the fourth state described above. However, the configuration is not limited to this. It is sufficient at least if the power consumption in the second state is lower than that in the above-described first state in the camera 100, and the power consumption in the fourth state is lower than that in the above-described third state in the flash 200. The time measurements in the respective processings in the interval shooting mode are appropriately performed by the built-in timers 111a and 202a of the camera 100 and the flash 200.

Figure 3A:
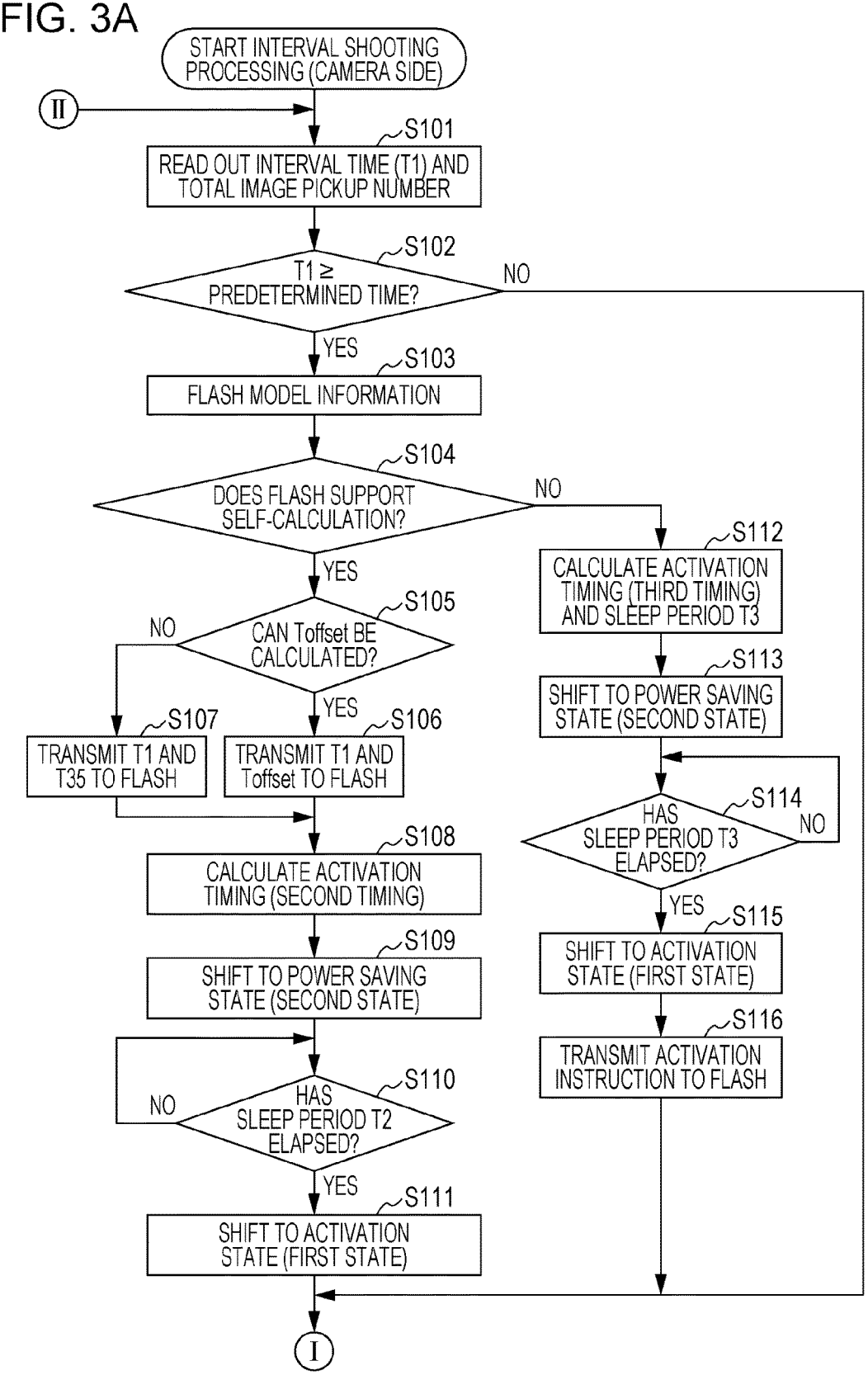

Hereinafter, processing of the camera 100 in the interval shooting mode according to the present embodiment (hereinafter, will be referred to as interval shooting processing) will be described with reference to FIGS. 3A and 3B. FIGS. 3A and 3B are flow charts for describing the interval shooting processing in the camera 100 functioning as the image pickup apparatus according to the first embodiment for carrying out the present invention. It is noted that the flow charts illustrate the processing after it is determined that the electronic device attached to the camera 100 is the flash 200 of the model in which the change of the operation state can be performed and also after the first image pickup is completed in accordance with the above-described basic operation in the interval shooting mode. The flow charts of FIGS. 3A and 3B also illustrate the processing in a case where the image of the subject is picked up while the flash 200 is caused to emit the light.

When the first image pickup is ended in a state in which the shooting mode of the camera 100 is set as the interval shooting mode, in step S101, the CPU 111 reads out image pickup conditions such as the interval time T1, a total image pickup number, and a total image pickup time from the memory 108. It is noted that setting of these image pickup conditions is performed by the user at an arbitrary timing before the interval shooting processing is started, and the thus set image pickup conditions are recoded in the memory 108. At this time, the setting method for the image pickup conditions by the user may follow a configuration for individually setting the interval time T1, the total image pickup number, and the total image pickup time or a configuration for making selections from among the previously determined image pickup conditions.

Next, in step S102, the CPU (determination unit) 111 determines whether or not the previously set interval time T1 is longer than or equal to a predetermined time. In step S102, when it is determined that the interval time T1 is longer than or equal to the predetermined time, the flow proceeds to step S103, and when it is determined that the interval time T1 is shorter than the predetermined time, the flow proceeds to step S117. That is, in a case where the interval time T1 is shorter than the predetermined time, the change of the operation state of the camera 100 which will be described below is not performed.

For example, in a case where the previously set interval time T1 is a relatively short interval or the like, power may be wastefully consumed in some cases while the operation state of the camera 100 is changed. In this case, the power consumption is increased while the state is changed to the power saving state. In view of the above, according to the present embodiment, through the processing in step S102, when it is determined that the interval time T1 is shorter than the predetermined time, the operation state of the camera 100 is not changed from the first state to the second state (power saving state). With this configuration, since whether or not the operation state of the camera 100 is changed can be determined in accordance with the set interval time T1, it is possible to suppress the power consumption. It is noted that, according to the present embodiment, the above-described predetermined time is set as 10 seconds as an example, but the configuration is not limited to this. For this predetermined time, any time may be set as long as the power consumption amount is not increased at least by changing the operation states of the camera 100 and the flash 200.

Next, in step S103, the CPU 111 reads out the flash model information previously transmitted from the flash 200 side and recorded in the memory 108.

Next, in step S104, the CPU 111 determines whether or not the attached flash 200 is a model supporting a calculation related to a change of its own operation state (self-calculation).

Specifically, the CPU 111 determines whether or not the flash 200 is a model supporting a setting in which a timing for changing its own operation state from the fourth state to the third state is calculated and its own operation state is changed on the basis of this timing irrespective of the instruction from the camera 100 side. It is noted that, in the following explanation, the timing for changing the operation state of the flash 200 from the fourth state to the third state will be referred to as flash activation timing (first timing).

In step S104, when it is determined that the flash 200 is the model supporting the self-calculation, the flow proceeds to step S105, and when it is determined that the flash 200 is a model that does not support the self-calculation, the flow proceeds to step S112. Hereinafter, processing in a case where the flow proceeds to step S105 will be described, and processing in a case where the flow proceeds to step S112 will be described later below.

In step S105, the CPU 111 determines whether or not correction information of the flash activation timing (hereinafter, will be referred to as timer offset information) Toffset can be calculated. As described above, the built-in timer 111a is provided to the camera 100, and the built-in timer 202a is provided to the flash 200. This is the configuration in which the camera 100 and the flash 200 can operate at previously set times as a result of the time measurements by these built-in timers. However, since timer accuracies (measurement accuracies) of the respective built-in timers are not necessarily accurately matched with each other, errors related to the measurements occur between the built-in timer 111a and the built-in timer 202a. In a case where the operation of the flash 200 is to be synchronized with the operation of the camera 100, operation periods, activation timings, and the like are to be determined by taking the above-described errors into account.

In view of the above, according to the present embodiment, the timer offset information Toffset based on the timer accuracies of the respective built-in timers is calculated as the correction information for correcting the above-described errors. Subsequently, the flash activation timing of the flash 200 (first timing) is adjusted (corrected) by using this timer offset information Toffset. Hereinafter, a detail thereof will be specifically described.

As described above, when the power supply of the flash 200 is turned on in a state in which the flash 200 is attached to the camera 100, a flash timer accuracy (first measurement accuracy) of the built-in timer 202a of the flash control unit 202 which functions as a first measurement unit is transmitted to the CPU 111 of the camera 100. After that, the CPU 111 reads out both a timer accuracy (second measurement accuracy) of the built-in timer 111a of the CPU 111 which is recorded in the memory 108 and the timer accuracy of the flash control unit 202 (first measurement accuracy) at a predetermined timing (for example, step S106). Next, the CPU 111 calculates a largest error value (hereinafter, will be referred to as worst error) ERR [%] among combinations of the timer accuracy of the camera 100 and the timer accuracy of the flash 200. Subsequently, the CPU (correction information calculation unit) calculates the timer offset information Toffset on the basis of this worst error ERR [%]. The timer offset information Toffset is calculated as follows by using Expression (1).

$$T\text{offset}=T1\ [\sec]\times ERR\ [\%] \quad (1)$$

It is noted that, in step S105, the case where the timer offset information Toffset can be calculated corresponds to a case where both the timer accuracies of the camera 100 and the flash 200 can be obtained. That is, the timer offset information Toffset is calculated only in a case where both the timer accuracy of the CPU 111 and the timer accuracy of the flash control unit 202 can be obtained.

With reference to FIG. 3A again, in step S105, when it is determined that the timer offset information Toffset can be calculated, the flow proceeds to step S106, and when it is determined that the timer offset information is not to be calculated, the flow proceeds to step S107.

In step S106, the CPU 111 reads out the timer accuracy of the CPU 111 and the timer accuracy of the flash control unit 202 from the memory 108 and calculates the timer offset information Toffset in accordance with Expression (1) described above. Subsequently, the CPU 111 transmits the calculated timer offset information Toffset and the interval time T1 to the flash control unit 202 by way of the serial communication. That is, the information related to the timing for picking up the image of the subject when the shooting mode of the camera 100 is set as the interval shooting mode is transmitted from the camera 100 side to the flash 200 side.

In step S107, the CPU 111 also reads out the interval time T1 and a previously recorded specific timer correction time T35 from the memory 108 to be transmitted to the flash control unit 202 by way of the serial communication. Herein, the timer correction time T35 refers to specific correction information for correcting the errors of the built-in timers between the camera 100 and the flash 200. The timer correction time T35 is the correction information used in a case where the timer offset information Toffset is not calculated.

As described above, the present embodiment relates to the configuration in which the timer offset information Toffset is not calculated in a case where only one of the timer accuracies of the camera 100 side and the flash 200 side can be obtained. Therefore, in a case where the timer offset information Toffset is not calculated, the flash activation timing is adjusted (corrected) by using the timer correction time T35 corresponding to the specific correction information stored in the memory 108. This point will be described in detail with reference to FIGS. 4A to 4C.

It is noted that the present embodiment relates to the configuration in which the flash control unit (first timing calculation unit) 202 subtracts a predetermined time from the interval time T1 to calculate a time interval until the next light emission. Specifically, the built-in timer 202a of the flash control unit 202 counts an elapsed time from the previous light emission. Subsequently, the flash control unit 202 subtracts the elapsed time counted by the built-in timer 202a from the interval time T1 received from the camera 100 side to calculate the time interval until the next light emission.

Next, in step S108, the CPU (second timing calculation unit) 111 calculates a camera activation timing (second timing) at which operation for changing the operation state of the camera 100 from the power saving state (second state) to the activation state (first state) is started. It is noted that a period (sleep period) T2 for maintaining the operation state of the camera 100 in the second state can be calculated by calculating the camera activation timing.

In the previous determination, when it is determined that the currently attached flash 200 is the model supporting the calculation related to the change of its own operation state, an instruction for changing the operation state of the flash 200 does not need to be issued from the camera 100 side to the flash 200. That is, when it is determined that the flash 200 is the model supporting the calculation related to the change of its own operation state, an instruction for cancelling the sleep of the flash 200 does not need to be issued from the camera 100 to the flash 200.

In view of the above, in step S108, the CPU 111 calculates an activation timing (second timing) while the interval time T1 and a time used for pre-image pickup preparation in the camera 100 (hereinafter, will be referred to as image pickup preparation time) are taken into account. That is, the timing for changing (returning) the operation state of the camera 100 from the power saving state to the activation state and the time for maintaining the power saving state are calculated without taking the time used for the charge of the flash 200 or the like into account.

The activation timing of the camera 100 is calculated by subtracting the time used for the above-described pre-image pickup preparation from the interval time T1. It is noted that the time used for the pre-image pickup preparation also includes a time (activation time) used for changing the operation state of the camera 100 from the power saving state to the activation state.

As described above, it is possible to calculate the sleep period T2 by calculating the activation timing (second timing) of the camera 100. A detail thereof will be described with reference to FIGS. 4A to 4C. FIGS. 4A to 4C are timing charts related to the operations of the digital camera 100 functioning as the image pickup apparatus according to the first embodiment for carrying out the present invention and the flash 200, and FIG. 4A illustrates the timing chart related to various operations in the camera 100 according to the present embodiment. As illustrated in FIG. 4A, the interval time T1 indicates the time interval from the start of the image pickup of the subject until the start of the next image pickup. In addition, a period T31 indicates a period from the start of the image pickup of the subject until the change to the second state. Furthermore, a period T32 indicates a period from when the operation state of the camera 100 is changed again to the first state until when the pre-image pickup preparation of the subject is completed. That is, the period T32 indicates the period from the camera activation timing until the completion of the pre-image pickup preparation. Under the above-described conditions, the sleep period T2 of the camera 100 is calculated by using Expression (2) as follows.

$$T2 = T1 - (T31 + T32) \quad (2)$$

Next, in step S109, the CPU (first state change unit) 111 changes the operation state of the camera 100 from the first state (activation state) to the second state (power saving state). In detail, operations and processings except for the operations and processings for the time measurement by the built-in timer 111a of the CPU 111 and the necessary and minimum operations and processings are stopped.

Next, in step S110, the CPU 111 determines whether or not a sleep period T2 has elapsed since the operation state is changed to the second state. Specifically, the built-in timer built in the CPU 111 of the camera 100 measures an elapsed time since the operation state of the camera 100 is changed from the first state to the second state, and it is determined whether or not the measured time exceeds the sleep period T2. In step S110, when it is determined that the measured time does not exceed the sleep period T2, the processing in step S110 is repeated, and when it is determined that the measured time exceeds the sleep period T2, the flow proceeds to step S111.

Next, in step S111, the CPU 111 (first state change unit) starts the operation for changing the operation state of the camera 100 from the second state (power saving state) to the first state (activation state) on the basis of the previously calculated camera activation timing. That is, the operation state of the camera 100 is returned to a state in which the image pickup of the subject can be performed.

Next, in step S117, the signal processing unit 107 executes the pre-image pickup preparations necessary for the respective units of the camera 100 before the image of the subject is picked up, and respective information calculated by the pre-image pickup preparations are recorded in the memory 108. It is noted that the detail of the pre-image pickup preparation is the same as described above.

The optical system drive control unit 112 reads out the AF evaluation value from the memory 108 via the CPU 111 and adjusts the positions of the respective lenses constituting the image pickup lens group 101 such that the focus state with respect to the subject is established. The image pickup control unit 113 reads out the exposure conditions (the exposure amount) from the memory 108 via the CPU 111 and executes the operations of the respective units of the camera 100 in accordance with the exposure conditions.

Next, in step S118, the CPU 111 determines whether or not the charge completion signal is received from the flash 200. This processing is repeatedly performed until when the charge completion signal is received from the flash 200. When it is determined in step S118 that the charge completion signal is received from the flash 200, the CPU 111 determines in step S119 whether or not the time measured in the built-in timer 111a exceeds the previously set interval time T1. That is, it is determined whether or not the interval time T1 has elapsed since the operation state of the camera 100 is changed to the first state.

In step S119, when it is determined that the interval time T1 has not elapsed, the processing in step S119 is repeated. On the other hand, when it is determined that the interval time T1 has elapsed, the flow proceeds to step S120, and the CPU 111 transmits a signal (image pickup start signal) indicating that the preparation for starting the image pickup of the subject has been completed to the flash 200. Subsequently, in step S121, the image pickup element 105 picks up the image of the subject. Subsequently, the obtained image data is subjected to various processings by the signal processing unit 107 and a conversion into the digital image data to be thereafter recorded in the memory 108 and the recording medium 110. At this time, the current number of image pickups is recorded in the memory 108 to update the image pickup number so far. The obtained digital image data is read out by the CPU 111 from the memory 108 and converted by the D/A conversion unit that is not illustrated in the drawing into the analog image data for the display to be thereafter displayed on the display unit 109 for quick review.

Next, in step S122, the CPU 111 reads out the total image pickup number recorded in the memory 108 and the image pickup number so far and determines whether or not the image pickup number so far has reached the total image pickup number. In step S122, when it is determined that the image pickup number so far has not reached the total image pickup number, in step S123, the CPU 111 transmits a signal (image pickup continuation signal) indicating that the image pickup of the subject continues to the flash control unit 202. Subsequently, the flow returns to step S101, and the interval shooting processing continues. It is noted that the processings in steps S101 to S108 are omitted in a case other than the cases where the interval time T1 or the total image pickup number is changed by the user.

In a case where the total image pickup number is not set, in other words, a case where the camera 100 has a setting in which the interval shooting is unlimitedly repeated until the user performs an operation or until the battery remaining amount runs out, the processing in step S122 is omitted.

In step S122, when it is determined that the image pickup number so far has reached the total image pickup number, the measurement by the built-in timer is ended, and the interval shooting processing on the camera 100 side is ended.

According to the present embodiment, it is determined whether or not the interval shooting mode continues in accordance with the number of times the images of the subject are picked up, but a configuration in which a total image pickup time corresponding to a total time during which the images of the subject are picked up is previously set, and the total image pickup time is compared with the elapsed time so far may also be adopted.

Hereinafter, processing when it is determined in step S104 that the flash 200 is not a model that supports the calculation for the sleep period will be described. A case where the flow proceeds to step S112 is a case where it is determined in step S104 that the flash 200 is not a model that supports the calculation for the sleep or the activation timing by the flash 200 itself. In this case, the operation state of the camera 100 needs to be changed from the second state to the first state while a certain degree of margin is secured by assuming a time used for the main capacitor 205 of the flash 200 to be charged to a predetermined voltage. That is, a camera activation timing (third timing) and a sleep period T3 are to be set such that the camera 100 can return to the activation state before the flash 200.

In view of the above, in step S112, the CPU 111 calculates a third timing on the camera 100 side and the sleep period T3 by assuming the time used for the flash 200 to be charged to the predetermined voltage. It is noted that the third timing is an activation timing at which the operation for changing the operation state of the camera 100 from the second state to the first state is started, and a timing regularly earlier than the activation timing of the flash 200 is set as the third timing.

According to the present embodiment, it is supposed that the maximum time used for the flash 200 (more specifically, the main capacitor 205 of the flash 200) to be charged is five seconds, and a margin of three seconds is further secured, so that the operation state of the camera 100 is returned from the power saving state to the activation state eight seconds before the image of the subject is picked up. That is, the activation timing (third timing) of the camera 100 is set as eight seconds before the image of the subject is picked up, and the sleep period T3 is set as a time obtained by subtracting eight seconds from the interval time T1. It is noted that any timing and period may be set as the third timing and the sleep period T3 as long as the charge of the main capacitor 205 of the flash 200 can be completed.

Next, in step S113, the CPU 111 changes the operation state of the camera 100 from the first state (activation state) to the second state (power saving state). Subsequently, in step S114, the CPU 111 determines whether or not the sleep period T3 has elapsed since the operation state is changed to the second state. The detail is similar to the processing in step S111. In step S114, when it is determined that the measured time exceeds the sleep period T3, the flow proceeds to step S115, and the operation for changing the operation state of the camera 100 from the second state to the first state is started on the basis of the previously calculated third timing.

Next, in step S116, the CPU 111 transmits an activation instruction (activation signal) to the flash control unit 202 of the flash 200, and the flow proceeds to step S117. It is noted that the activation instruction is a signal for instructing the start of the operation for changing the operation state of the flash 200 from the flash power saving state which will be described below to the flash activation state. The subsequent processings are the same as described above. The operation of the camera 100 in the interval shooting mode has been described above.

Figure 5:
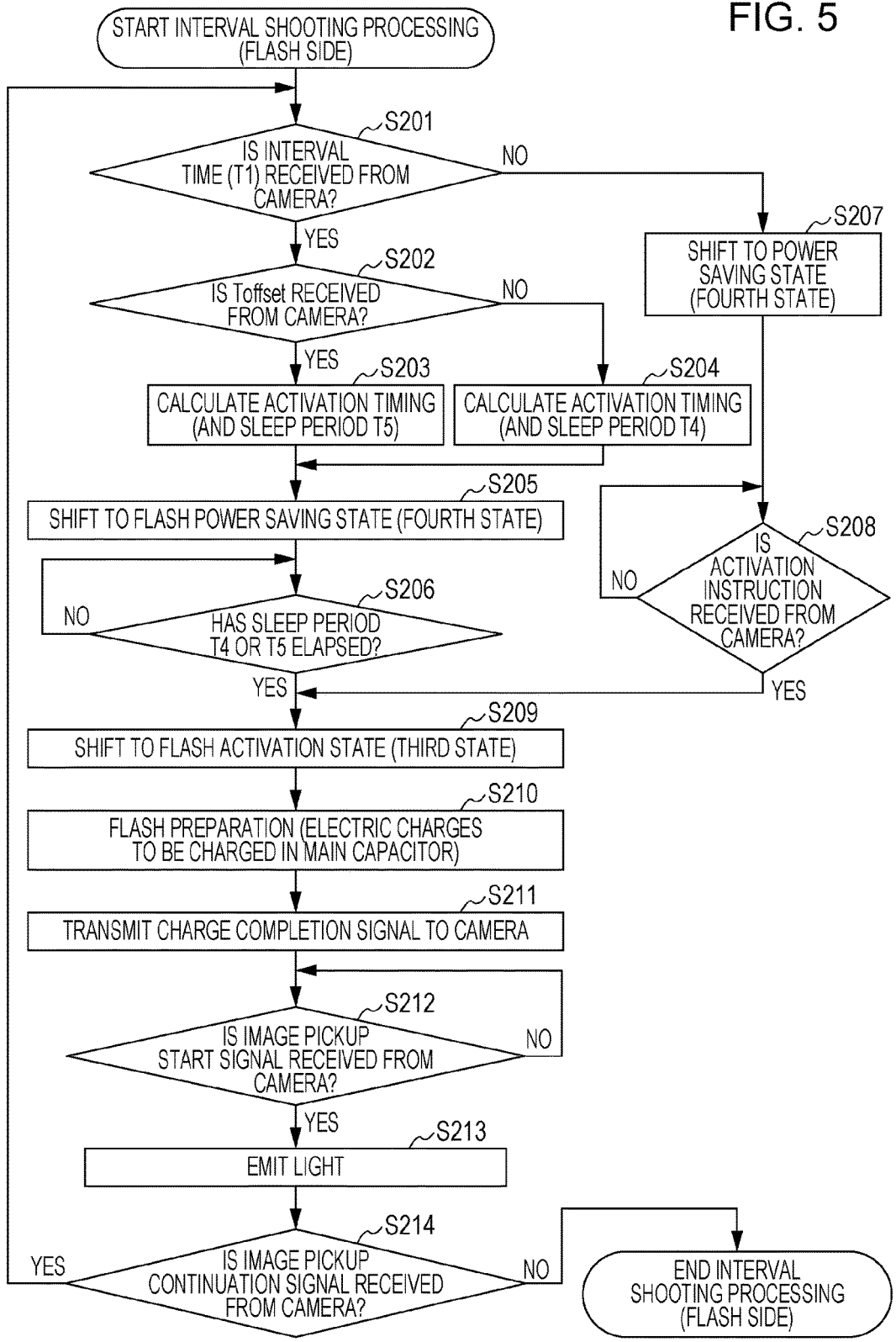
FIG. 5 is a flow chart for describing the interval shooting processing in the flash functioning as an electronic device according to the first embodiment for carrying out the present invention.

Hereinafter, the interval shooting processing in the flash 200 will be described with reference to FIG. 5. FIG. 5 is a flow chart for describing the interval shooting processing in the flash 200 functioning as the electronic device according to the first embodiment for carrying out the present invention. It is noted that the shooting mode of the camera 100 is set as the interval shooting mode in the flow chart, and this flow chart illustrates the processing after the first image pickup has been completed by way of the basic operation already described above. The flow chart of FIG. 5 also illustrates the processing in a case where the image of the subject is picked up in a state in which the flash 200 is caused to emit the light.

When the first image pickup is ended in a state in which the camera 100 is set in the interval shooting mode, in step S201, the flash control unit 202 determines whether or not the interval time T1 corresponding to the information related to the timing for picking up the image of the subject is received from the CPU 111. It is noted that, according to the present embodiment, the above-described timing for picking up the image of the subject is the timing to start the accumulation of the electric charges corresponding to the optical image of the subject by the image pickup element 105.

As described above, in a case where the flash 200 is a model supporting the calculation related to the change of its own operation state (self-calculation), the interval time T1 is transmitted from the camera 100 side to the flash 200 side. In the determination in step S201, when it is determined that the interval time T1 is received from the camera 100 side, the flow proceeds to step S202, and when it is determined that the interval time T1 is not received from the camera 100 side, the flow proceeds to step S207.

Next, in step S202, the flash control unit 202 determines whether or not the timer offset information Toffset is received from the CPU 111 of the camera 100. In the determination in step S202, when it is determined that the timer offset information Toffset is received, the flow proceeds to step S203, and when it is determined that the timer offset information Toffset is not received, the flow proceeds to step S204.

Next, in steps S203 and S204, the flash control unit (first timing calculation unit) 202 calculates the flash activation timing (first timing) at which the operation for changing the operation state of the flash 200 from the fourth state to the third state is started. That is, the flash control unit 202 calculates the activation timing at which the operation for changing the operation state of the flash 200 from the flash power saving state to the flash activation state is started. It is noted that sleep periods T4 and T5 during which the operation state of the flash 200 is maintained at the flash power saving state (fourth state) can also be calculated by calculating the flash activation timing (first timing).

The flash activation timing of the flash 200 is calculated by subtracting a time (charge time) used for the flash 200 to be charged from the interval time T1. This charge time is a time used for the main capacitor 205 to be charged with the electric charges corresponding to the predetermined voltage. It is noted that the charge time also includes a time (activation time) for changing the operation state of the flash 200 from the flash power saving state to the flash activation state. In addition, the charge time is a time in which the timer offset information Toffset and the timer correction time T35 from the CPU 111 are also taken into account.

As described above, the sleep period of the flash 200 can be calculated by calculating the flash activation timing of the flash 200 (first timing). A detail thereof will be described with reference to FIGS. 4B and 4C. It is noted that FIG. 4B is a timing chart related to various operations in a case where the timer offset information Toffset in the flash 200 according to the present embodiment is not taken into account. FIG. 4C is a timing chart related to various operations in a case where the timer offset information Toffset in the flash 200 according to the present embodiment is taken into account. That is, FIGS. 4B and 4C respectively illustrate the operation timings and operation states of the flash 200 in a case where the timer correction time T35 is taken into account and a case where the timer offset information Toffset is taken into account for illustrative purposes.

In FIGS. 4B and 4C, a period T33 is a period from the start of the predetermined operation performed in synchronism with the image pickup of the subject such as the light emission of the flash unit 207 of the flash 200 until when the operation state of the flash 200 is changed to the fourth state. A period T34 is a period from the ideal timing at which the operation for changing the operation state of the flash 200 from the fourth state to the third state is started until when the above-described predetermined operation is started. The period T34 indicates an exemplary charge time used for causing the flash 200 to emit the light at an appropriate light emission amount. It is noted that the period T34 includes a standby time of the flash 200 which is prepared because of a charge time set by taking into account a temporal margin which will be described below.

As described above, errors related to the measurements mutually occur in the built-in timers of the camera 100 and the flash 200. Therefore, operation periods, activation timings, and the like are to be determined by taking the errors of the respective built-in timers into account. That is, the operation state of the flash 200 needs to be changed to the flash activation state while the temporal margin such as the period T34 is prepared in addition to the charge time.

In view of the above, according to the present embodiment, the time used for the main capacitor 205 to be charged with the predetermined voltage is taken into account, and the sleep period T4 or T5 is calculated by adding the timer offset information Toffset or the timer correction time T35 to the periods T33 and T34. The sleep periods T4 and T5 are calculated by using Expression (3) or Expression (4) as follows.

$$T4=T1-(T33+T34+T35) \quad (3)$$

$$T5=T1-(T33+T34+T\text{offset}) \quad (4)$$

As illustrated in Expression (4) and FIG. 4C, in a case where the timer offset information Toffset is taken into account, it is possible to accurately find out the timer errors of the camera 100 and the flash 200. In contrast to that, as illustrated in Expression (3) and FIG. 4B, in a case where the timer correction time T35 is taken into account, the operation state of the flash 200 is changed to the flash activation state while the previously determined sufficient margin is prepared. That is, it is possible to lengthen the period during which the operation state of the flash 200 is maintained at the flash power saving state in a case where the timer offset information Toffset is taken into account compared to a case where the timer correction time T35 is taken into account.

With this configuration, as illustrated in FIGS. 4B and 4C, it is possible to shorten the standby time of the flash 200 in a case where the timer offset information Toffset is taken into account compared to a case where the timer correction time T35 is taken into account. Therefore, in a case where the timer offset information Toffset is calculated, it is possible to suppress the power consumption in the flash 200.

With reference to FIG. 5 again, in step S205, the flash control unit (second state change unit) 202 changes the operation state of the flash 200 from the third state (flash activation state) to the fourth state (flash power saving state). In detail, operations and processings except for the operations and processings for the time measurement by the built-in timer in the flash 200 and the necessary and minimum operations and processings are stopped.

Next, in step S206, the flash control unit 202 determines whether or not the sleep period T4 or T5 has elapsed since the operation state is changed to the fourth state. Specifically, the built-in timer 202a built in the flash 200 measures an elapsed time since the operation state of the flash 200 is changed from the third state to the fourth state. Subsequently, the flash control unit 202 determines whether or not the measured time exceeds the sleep period T4 or T5. In step S206, when it is determined that the measured time does not exceed the sleep period T4 or T5, the processing in step S206 is repeated. On the other hand, in step S206, when it is determined that the measured time exceeds the sleep period T4 or T5, the flow proceeds to step S209.

Next, in step S209, the flash control unit 202 starts the operation for changing the operation state of the flash 200 from the fourth state to the third state on the basis of the previously calculated flash activation timing. That is, the operation for returning the operation state of the flash 200 to a state in which the subject can be illuminated with light at a necessary light emission amount is started.

Next, in step S210, the flash control unit 202 causes the flash power supply unit 203 and the charge circuit (charge unit) 204 to start the charge of the main capacitor 205 with the electric charges.

Next, in step S211, the flash control unit 202 transmits a signal (charge completion signal) indicating that the charge of the main capacitor 205 to the predetermined voltage is completed to the CPU 111 of the camera 100. Subsequently, in step S212, the flash control unit 202 determines whether or not the image pickup start signal is received from the CPU 111 of the camera 100.

According to the present embodiment, the flash 200 needs to be caused to emit the light in tune with the image pickup of the subject by the camera 100. That is, the flash unit 207 of the flash 200 needs to be caused to emit the light in tune with the period during which the exposure is performed by the image pickup element 105. The processing in step S212 is processing for strictly matching the timing for causing the flash 200 to emit the light to the timing for the camera 100 to pick up the image of the subject (exposure timing) because of the above-described reason.

The present embodiment relates to the configuration in which the above-described processings in steps S211 and S212 on the flash 200 side and the above-described processings in steps S118 and S120 in the camera 100 are performed, but the configuration is not limited to this. For example, a configuration in which the charge completion signal, the image pickup start signal, and the like are not transmitted from the flash 200 and the camera 100 may also be adopted. In this case, the flash control unit 202 of the flash 200 obtains the timer accuracy of the built-in timer of the camera 100 when the interval time T1 is obtained from the camera 100 side and calculates the timing for the camera 100 to pick up the image of the subject to cause the flash unit 207 to emit the light. That is, the timing for causing the flash 200 to emit the light is calculated on the basis of the interval time T1 corresponding to the information related to the timing for picking up the image of the subject when the shooting mode of the camera 100 is set as the interval shooting mode.

With reference to FIG. 5 again, in step S212, the flash control unit 202 determines whether or not the image pickup start signal is received from the CPU 111 of the camera 100. In step S212, when it is determined that the image pickup start signal is received from the camera 100 side, the flow proceeds to step S213, and when it is determined that the image pickup start signal is not received from the camera 100 side, the processing in step S212 is repeated. Subsequently, in step S213, the flash control unit 202 causes the flash unit 207 to emit the light in tune with the image pickup timing of the camera 100. It is noted that, to accurately set a time interval until the next image pickup, counting of an elapsed time is started by the built-in timer of the flash control unit 202 at the same time as the end of the processing in step S213. Subsequently, a timing for causing the flash unit 207 to emit the light for the next time is calculated by subtracting this counted time from the interval time T1 transmitted from the camera 100.

Next, in step S214, the flash control unit 202 determines whether or not the image pickup continuation signal is received from the CPU 111. When it is determined that the image pickup continuation signal is received in this processing, the flow returns to step S201, and the interval shooting processing continues. It is noted that, similarly as in the camera 100 side described above, in a case where the camera 100 has a setting in which the interval shooting is unlimitedly repeated, the processing in step S214 is omitted, and the flow returns to step S201. In addition, similarly as in the camera 100 side, in a case except for a case where the user changes the interval time T1 or the total image pickup number, the processings in steps S201 to S204 are omitted. In step S214, when it is not determined that the image pickup continuation signal is received, the measurement by the built-in timer is ended, and the interval shooting mode is ended.

It is noted that, according to the present embodiment, a reason why the charge completion signal is transmitted in tune with the charge completion of the main capacitor 205 is that the time used for charging the main capacitor 205 to the predetermined voltage is the longest among the preparations for illuminating the subject with light by the flash 200. For example, in a case where a preparation operation in the flash 200 which takes longer than the charge of the main capacitor 205 to the predetermined voltage exists, a configuration in which the signal is transmitted from the flash 200 side to the camera 100 side in tune with this preparation operation may also be adopted.

Hereinafter, the processing in a case where the flash control unit 202 determines in step S201 that the interval time T1 is not received from the camera 100 side will be described.

As described above, a case where the flash 200 does not receive the interval time T1 from the camera 100 side is a case where the flash 200 does not support the calculation of the sleep period or the activation timing by the flash 200 itself. In this case, the operation state of the flash 200 needs to be set by the CPU 111. That is, the change of the operation state of the flash 200 needs to be instructed from the camera 100 side to the flash 200 side.

In step S207, the flash control unit 202 starts the operation for changing the operation state of the flash 200 to the power saving state (fourth state). Subsequently, in step S208, the flash control unit 202 determines whether or not the activation instruction of the flash 200 is received from the CPU 111 of the camera 100. In step S208, when it is determined that the activation instruction of the flash 200 is not received from the camera 100 side, the processing in step S208 is repeated. On the other hand, when it is determine that the activation instruction of the flash 200 is received from the camera 100 side, the flow proceeds to step S209. Since the subsequent processings are similar to the processings in steps S209 to S213 described above, descriptions thereof will be omitted. The interval shooting processing on the flash 200 side has been described above.

As described above, with the flash 200 according to the present embodiment, the flash control unit 202 can calculate the flash activation timing even in a case where the interval shooting mode is set. That is, the flash 200 can calculate its own activation timing without receiving the activation instruction from the camera 100 side. Furthermore, the flash control unit 202 can change the operation state of the flash 200 from the flash power saving state to the flash activation state on the basis of the flash activation timing.

With this configuration, the camera 100 according to the present embodiment does not need to transmit the activation instruction to the flash 200. Therefore, the CPU 111 can change the operation state of the camera 100 from the power saving state to the activation state on the basis of the time used for the image pickup preparation on the camera 100 side.

Herein, in the case of the configuration in which the change of the operation state is instructed from the camera 100 side to the flash 200 side such as the activation instruction, to change the operation state of the flash 200, the camera 100 needs to be set in the activation state. In this case, before the operation state of the flash 200 is changed, the operation state of the camera 100 needs to be changed to the activation state. However, the preparation time before the image pickup related to the camera side such as photometry and ranging is generally shorter than the light emission preparation time of the flash such as the charge time. Therefore, if the operation state of the camera 100 is changed to the activation state before the operation state of the flash 200 is changed, power is wastefully consumed on the camera 100 side.

In contrast to this, while the camera 100 and the flash 200 according to the present embodiment adopt the above-described configurations, it is possible to respectively individually calculate the activation timings and change the operation states. With this configuration, the camera 100 according to the present embodiment can change the operation state of the camera 100 from the power saving state to the activation state without taking the change of the operation state of the flash 200 into account. That is, even in a case where the camera 100 and the flash 200 are set in the interval shooting mode, it is possible to suppress the power consumption on the camera 100 side.

Therefore, with the camera 100 and the flash 200 according to the present embodiment, even in a case where the image of the subject is picked up at the set time, it is possible to suppress the power consumption of the camera 100.

The present embodiment relates to the configuration in which the photometry calculation and the dimmer calculation are calculated by using the image data obtained in the camera 100, and the light emission amount of the flash 200 is calculated, but the configuration is not limited to this. For example, a configuration in which a photometry unit and a calculation unit are provided in the flash 200, and the flash 200 independently calculates the light emission amount for illuminating the subject with the light may also be adopted.

In addition, the present embodiment relates to the configuration in which the first image pickup is performed in accordance with the operation of the operation unit 116 by the user in a case where the interval shooting mode is set, but the configuration is not limited to this. For example, a configuration in which a time for starting the image pickup is previously set by the user, and the image pickup of the subject is started from this set time may also be adopted. In this case, a configuration in which the operation states of the camera 100 and the flash 200 before the first image pickup is started are set as the power saving state and the flash power saving state respectively may also be adopted.

Furthermore, with this configuration, the presence or absence of the light emission in accordance with the luminance of the subject can also be determined on the flash 200 side. Specifically, it is determined whether or not the flash control unit 202 causes the flash 200 to emit the light on the basis of the luminance of the subject after the photometry performed by the photometry unit provided in the flash 200. In a case where the flash 200 does not need to be caused to emit the light, a control is performed such that the flash unit 207 is not caused to emit the light, and a signal indicating that the light emission is not performed is transmitted from the flash control unit 202 to the camera 100 side. Therefore, in a case where the flash 200 does not need to be caused to emit the light, since the processing related to the flash 200 can be avoided on the camera 100 side, the power consumption of the camera 100 can be further suppressed.

The descriptions have also been made while the flash 200 according to the present embodiment described above is detachably attached to the camera 100, but the configuration is not limited to this. For example, a configuration in which the camera 100 and the flash 200 which can mutually perform a wireless communication are used, and the camera 100 and the flash 200 establish the communication with each other may also be adopted. Furthermore, with the above-described configuration, it is also possible to realize the configuration characteristic to the present embodiment by using a plurality of flashes that can communicate with the camera 100. For example, a configuration in which the CPU 111 of the camera 100 or the flash control unit 202 of the flash 200 controls the flashes other than the flash 200 in an overall manner in a state in which the flash 200 is attached to the camera 100 may also be adopted. It is noted that communication units in the case of this configuration correspond to wireless communication units provided within the camera 100 and provided in the flash 200.

Any devices having a camera function may be adopted as the image pickup apparatus according to the present embodiment. For example, a portable device such as a digital video camera or a smart phone is adopted as the image pickup apparatus, and a configuration in which the operation of the image pickup apparatus is synchronized with the operation of the flash 200 may also be adopted.

Second Embodiment

According to a second embodiment of the present invention, a case where images of a subject are picked up while a plurality of digital cameras are set to be in synchronism with each other will be described. Specifically, two digital cameras (hereinafter, will be simply referred to as cameras) 300 are used to perform the interval shooting.

Figure 6:
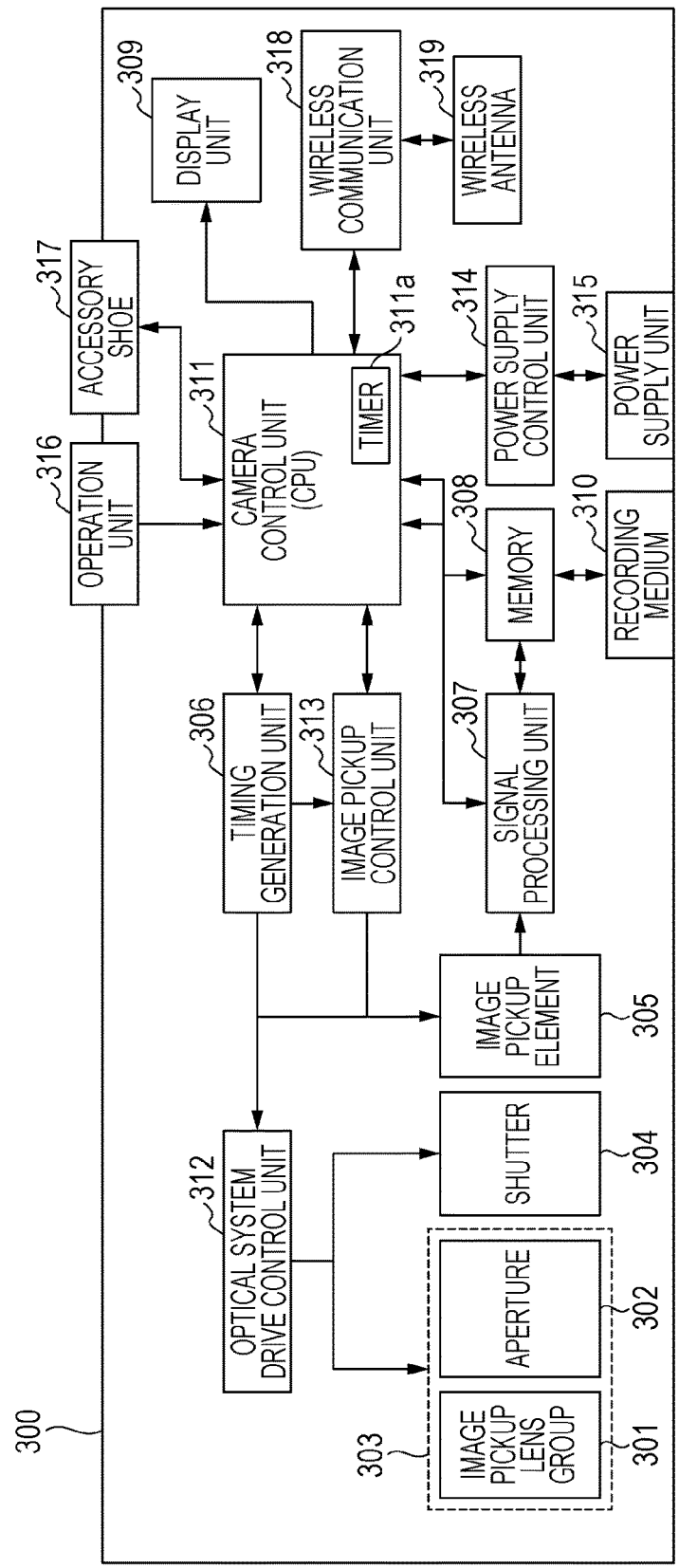
FIG. 6 is a block diagram for describing a configuration of a digital camera functioning as an image pickup apparatus according to a second embodiment for carrying out the present invention.

Hereinafter, a detail thereof will be described with reference to FIG. 6, FIGS. 7A and 7B, FIG. 8, and FIGS. 9A and 9B. FIG. 6 is a block diagram for describing a configuration of the camera 300 functioning as the image pickup apparatus according to the second embodiment for carrying out the present invention. It is noted that, with regard to an internal structure of the camera 300, descriptions of structures similar to the camera 100 according to the above-described first embodiment will be omitted. Therefore, in the second embodiment, an image pickup optical system 303 that include an image pickup lens group 301 and the aperture 302 has same structures as the image pickup optical system 103 in first Embodiment. And, in the second embodiment, a shutter 304 and an image pickup element 305 and a timing generation unit 306 have same structures as the shutter 104 and the image pickup element 105 and the timing generation unit 106 in first Embodiment. And, in the second embodiment, an optical system drive control unit 312 and an image pickup control unit 313 and a power supply control unit 314 have same structures as the optical system drive control unit 112 and the image pickup control unit 113 and the power supply control unit 114 in the first embodiment. Furthermore, in the second embodiment, an accessory shoe 317 has same structures as the accessory shoe 117 in first Embodiment.

According to the present embodiment, the camera 300 on a master side will be referred to as master camera, and the camera 300 on a slave side will be referred to as slave camera. As compared with the above-described first embodiment, the camera 300 on the master side is an image pickup apparatus corresponding to the camera 100 according to the above-described first embodiment. The camera 300 on the slave side is an electronic device corresponding to the flash 200 according to the above-described first embodiment.

A wireless communication unit (communication unit) 318 of the camera 300 is a communication processing unit configured to perform communication processing with another camera via a wireless antenna 319 and also perform processing used for the wireless communication such as a conversion into a data format for the communication. It is noted that the master camera and the slave camera are put into a communicable state when the wireless communication units 318 mutually establish a link based on a wireless communication LAN.

According to the present embodiment, an ad hoc connection system is adopted as a connection system for the master camera and the slave camera, but an infrastructure connection system via an access point may also of course be adopted. In addition, a configuration in which a wireless connection system such as Bluetooth (registered trademark) instead of the wireless LAN communication is used may also be adopted.

As a method of establishing the link between the master camera and the slave camera, one of the cameras 300 is operated to register (set) the other camera 300 as a communication partner in a state in which both the cameras 300 are in the wirelessly communicable state. According to the present embodiment, information of the registered (set) slave camera can be displayed on a graphical user interface (GUI) displayed on a display unit 309 of the camera 300 corresponding to the master camera. While the user operates an operation unit 316 or the like and selects a predetermined menu displayed on the GUI, it is possible to set start and end of the wireless communication with the registered (set) slave camera. It is noted that the method of establishing the link between the master camera and the slave camera is not limited to this, and other methods may also be adopted.

The operation of the slave camera can be synchronized with the operation of the master camera in a state in which the link between the master camera and the slave camera is established (communicable state). For example, when the release button of the operation unit 316 of the master camera is put into the SW1 state in a state in which the link between the master camera and the slave camera is established, the image pickup preparation for picking up the image of the subject is started in both the master camera and the slave camera. That is, it is possible to perform the image pickup preparations for picking up the image of the subject while the master camera is synchronized with the slave camera.

In the cameras 300 according to the present embodiment, when the interval shooting mode is set on the master camera side in a state in which the link between the master camera and the slave camera is established, the interval shooting mode is also set on the slave camera side. Specifically, when the master camera is set in the interval shooting mode by a CPU (first mode setting unit) 311 on the master camera side, the slave camera is set in the interval shooting mode by the CPU (second mode setting unit) 311 on the slave camera side. That is, the setting of the shooting mode can be synchronized with each other in the master camera and the slave camera.

In the cameras 300 according to the present embodiment, similarly as in the above-described first embodiment, the interval shooting mode (first shooting mode) and the normal shooting mode (second shooting mode) can be set as the shooting modes. The interval shooting mode refers to a shooting mode for continuously picking up images of the subject at a set time interval. Meanwhile, the normal shooting mode refers to a shooting mode for picking up an image of the subject once. It is noted that the cameras 300 according to the present embodiment may perform any operations other than the above-described operations in a synchronous manner between the master camera and the slave camera as long as the operations can be performed in synchronism with each other. In addition, a configuration in which the master camera is operated in synchronism with the operation of the slave camera may also be adopted.

When the link between the master camera and the slave camera is established by operating the master camera, information related to the camera 300 on the slave side (hereinafter, will be referred to as camera information) is transmitted from the slave camera to the master camera. This camera information includes predetermined information used to be synchronized with the camera 300 on the master side such as a model of the camera 300 on the slave side.

In a case where the master camera is set in the interval shooting mode, the master camera determines, on the basis of the camera information transmitted from the slave camera, whether or not the slave camera is a model that can change its own operation state.

Furthermore, the master camera can determine whether or not the slave camera is a model supporting calculation for a sleep period and a slave activation timing (first timing) for returning from the sleep on the basis of the camera information transmitted from the slave camera. This detail will be described below in the explanation of the interval shooting mode. It is noted that the above-described camera information is previously stored in a memory 308 of the camera 300 on the slave side, and the CPU 311 of the slave camera transmits the camera information to the master camera side. The basic configuration of the camera 300 according to the present embodiment has been described above.

Hereinafter, the operation when both the master camera and the slave camera are synchronized with each other to pick up the images of the subject will be described. It is noted that the basic operation of the camera 300 when the image of the subject is picked up is similar to that of the camera 100 according to the above-described first embodiment, and detailed descriptions thereof will be omitted.

When the master camera and the slave camera are put into a state in which both power supplies are turned on and the cameras are in a communicable state, the CPU 311 of the slave camera transmits the camera information to the CPU 311 of the master camera. The master camera records the received camera information in the memory 308.

When the release button of the operation unit 316 of the master camera is put into the SW1 state, an image pickup preparation signal for instructing the image pickup preparation for picking up the image of the subject is transmitted from the CPU 311 of the master camera to the CPU 311 of the slave camera. Subsequently, both the master camera and the slave camera execute various processings and calculations related to the pre-image pickup preparation for picking up the image of the subject.

Similarly as in the above-described first embodiment, a signal processing unit 307 performs the AF processing, the photometry calculation, and the AE processing as the pre-image pickup preparations according to the present embodiment. It is noted that the exposure amount set in the AE processing is set by changing the exposure conditions such as an aperture value Av, an exposure time Tv, and a gain amount Sv similarly as in the above-described first embodiment. In addition, the AF processing and the other various processings may be performed in any order, and a configuration in which those processings are performed in parallel may also be adopted. The respective parameters calculated in the pre-image pickup preparations are recorded in the memory 308 and appropriately read out by the CPU 311 when needed.

When the release button of the operation unit 316 of the master camera is put into the SW2 state, the CPU 311 of the master camera sets exposure timings related to start and end of the exposures in its own camera and the slave camera on the basis of the previously obtained camera information of the slave camera. Subsequently, the set exposure timings are recorded in the memory 308 on the master camera side and transmitted to the slave camera side at the same time. The CPU 311 of the slave camera records the exposure timings transmitted from the master camera side in the memory 308.

The exposure timings need to be set by taking into account an influence from a time lag of the instruction from the master camera to the slave camera, a transmission timing of a beacon of the wireless communication unit 318, and an influence from the wireless communication using the same frequency band. According to the present embodiment, in view of a time lag of the communication from the master camera to the slave camera or the like, the entire exposure timings are set in tune with the exposure timings on the slave camera side. That is, the timings for the start and the end of the exposure on the master camera side are set in tune with the timings at which the start and the end of the exposure can be carried out on the slave camera side.

The CPUs 311 of the master camera and the slave camera respectively read out the set exposure timings from the memories 308, and the master camera and the slave camera perform the image pickup of the subject in synchronism with each other to obtain the analog image data.

The analog image data is converted into the digital image data by the signal processing unit 307 and subjected to the above-described various processings by the signal processing unit 307 to be thereafter recorded in the memory 308. The digital image data read out by the CPU 311 from the memory 308 is converted into the analog image data for display by the D/A conversion unit that is not illustrated in the drawing to be appropriately displayed on the display unit 309 for review. The digital image data recorded in the memory 308 is read out by the CPU 311, and this digital image data is recorded in a recording medium 310. The basic operation for picking up the images of the subject while both the master camera and the slave camera are in synchronism with each other has been described above.

Interval Shooting Mode

Hereinafter, a case where the camera 300 performs the interval shooting will be described. It is noted that, in the following explanation, a case where the interval shooting mode is set as the shooting mode for the camera 300 on the master side in a state in which the link between the master camera and the slave camera is established will be described as an example.

In a case where the shooting mode is set as the interval shooting mode, the operation state of the camera 300 can be changed to the first state (activation state) in which the image of the subject can be picked up and the second state (power saving state) in which the power consumption is lower than the first state. It is noted that, similarly as in the above-described first embodiment, in a case where the operation state of the camera 300 is the second state, a state is established in which the power consumption in the camera 300 is at least lower than the case of the first state.

Figure 7A:
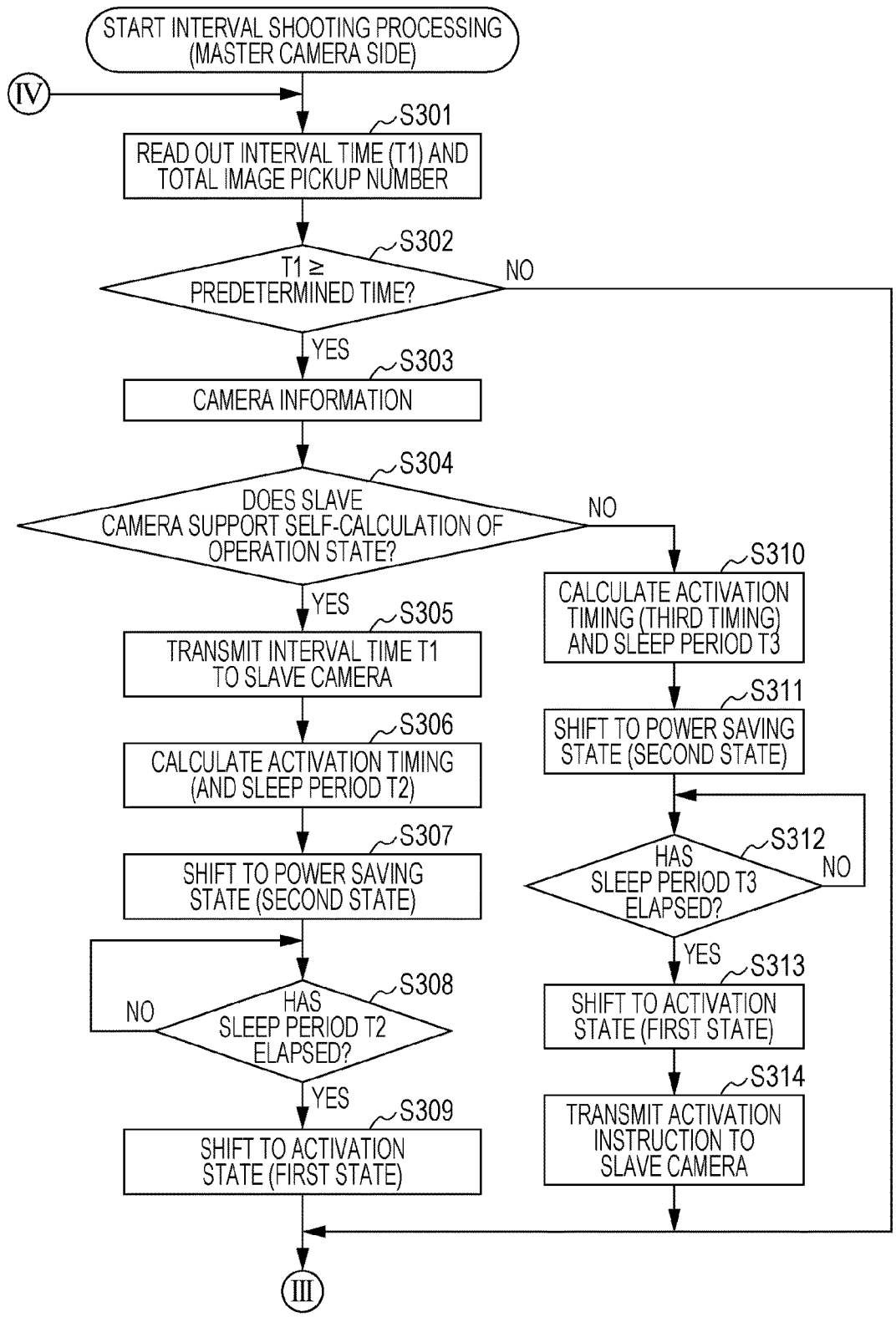
FIG. 7A and FIG. 7B are flow charts for describing the interval shooting processing in the digital camera on a master camera side which functions as the image pickup apparatus according to the second embodiment for carrying out the present invention.
Figure 7B:
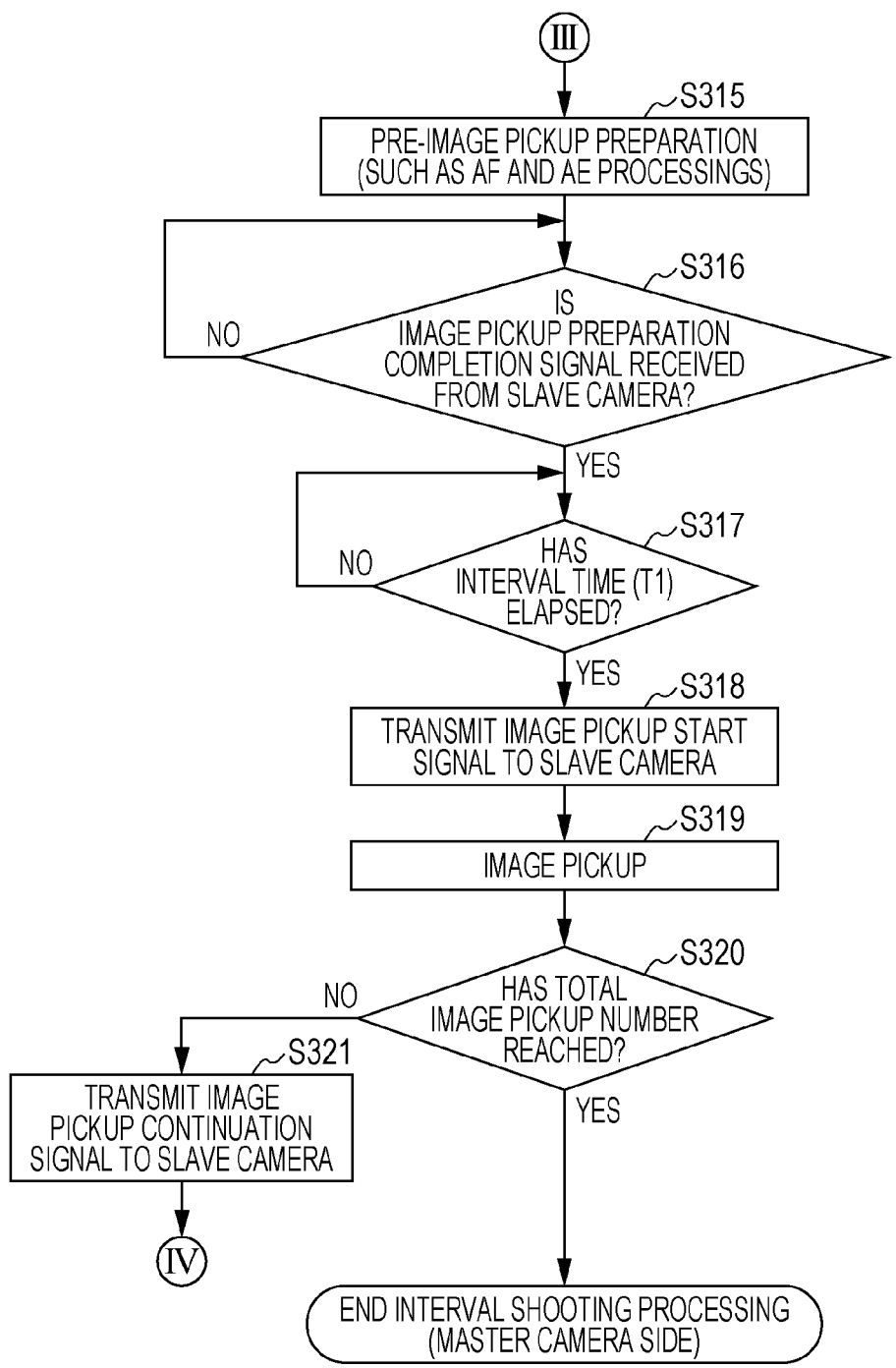

Hereinafter, processing in the interval shooting mode in the master camera according to the present embodiment (hereinafter, will be referred to as interval shooting processing) will be described with reference to FIGS. 7A and 7B. FIGS. 7A and 7B are flow charts for describing the interval shooting processing of the camera 300 on the master side which functions as the image pickup apparatus according to the second embodiment for carrying out the present invention. It is noted that the flow charts illustrate the processing after the first image pickup is completed by way of the above-described basic operations in the cameras 300 on both the master camera side and the slave camera side in the interval shooting mode. In the following explanation, a case where the operation state of the slave camera is the first state or the second state corresponds to a case where the operation state of the flash 200 is the third state or the fourth state according to the above-described first embodiment.

Since processings in steps S301 and S302 are similar to those in steps S101 to S102 according to the above-described first embodiment, descriptions thereof will be omitted. In step S303, the CPU 311 reads out the camera information that is transmitted from the camera 300 functioning as the slave camera and recorded in the memory 308.

Next, in step S304, the CPU 311 determines whether or not the slave camera having the link established with the master camera is a model supporting the calculation related to the change of its own operation state (self-calculation). That is, it is determined whether or not the slave camera is a model supporting the calculation for the slave activation timing for returning its own operation state from the second state to the first state. It is noted that as described above, by calculating the slave activation timing (first timing), it is possible to calculate the period (sleep period T4) at the same time during which the operation state of the slave camera is maintained at the second state. It is noted that the activation timing of the master camera (master activation timing) is set as the second timing. The sleep period of the master camera is set as the sleep period T2.

In step S304, when it is determined that the slave camera is a model supporting the self-calculation, the flow proceeds to step S305, and when it is determined that the slave camera is a model that does not support the self-calculation, the flow proceeds to step S310. Since processings in steps S310 to S314 are substantially the same as those in steps S112 to S116 according to the above-described first embodiment, descriptions thereof will be omitted.

In step S305, the CPU 311 reads out the interval time T1 corresponding to the information related to the timing for picking up the image of the subject in the interval shooting from the memory 308. Subsequently, the CPU 311 transmits the read interval time T1 to the CPU 311 of the slave camera. According to the present embodiment, the same cameras 300 are used as the master camera and the slave camera, different from the above-described first embodiment. Therefore, no large differences of timer accuracies occur in built-in timers 311a provided in the CPUs 311 of the master camera and the slave camera. Therefore, according to the present embodiment, sleep of the slave camera is cancelled on the basis of the timer correction time T35 that is a specific value without taking the calculation for the timer offset information into account as in the above-described first embodiment. This point will be described below.

Since processings in the following steps S306 to S309 and S315 are substantially similar to those in steps S108 to S111 and S117 according to the above-described first embodiment, descriptions thereof will be omitted.

In step S316, the CPU 311 determines whether or not an image pickup preparation completion signal is received from the slave camera. This processing is repeatedly performed until when the image pickup preparation completion signal is received from the slave camera. Since processing in step S317 is similar to that in step S119 according to the above-described first embodiment, descriptions thereof will be omitted.

In step S318, the CPU 311 transmits a signal (image pickup start signal) indicating that the preparation for starting the image pickup of the subject is completed to the slave camera. According to the present embodiment, the images of the subject are picked up in tune with the interval time T1 measured by the built-in timer of the master camera while both the master camera and the slave camera are in synchronism with each other. In view of the above, when the time measured on the master camera side exceeds the interval time T1, the CPU 311 transmits the image pickup start signal for instructing the image pickup of the subject to the slave camera.

This image pickup start signal includes information related to the exposure timings for the master camera and the slave camera on the basis of the previously obtained camera information of the slave camera. With this configuration, it is possible to perform the image pickup of the subject by the master camera and the slave camera in synchronism with each other by transmitting the image pickup start signal from the master camera to the slave camera.

Since processings in steps S319 to S321 are substantially similar to those in steps S121 to S123 according to the above-described first embodiment, descriptions thereof will be omitted. The interval shooting processing of the master camera has been described above.

Figure 8:
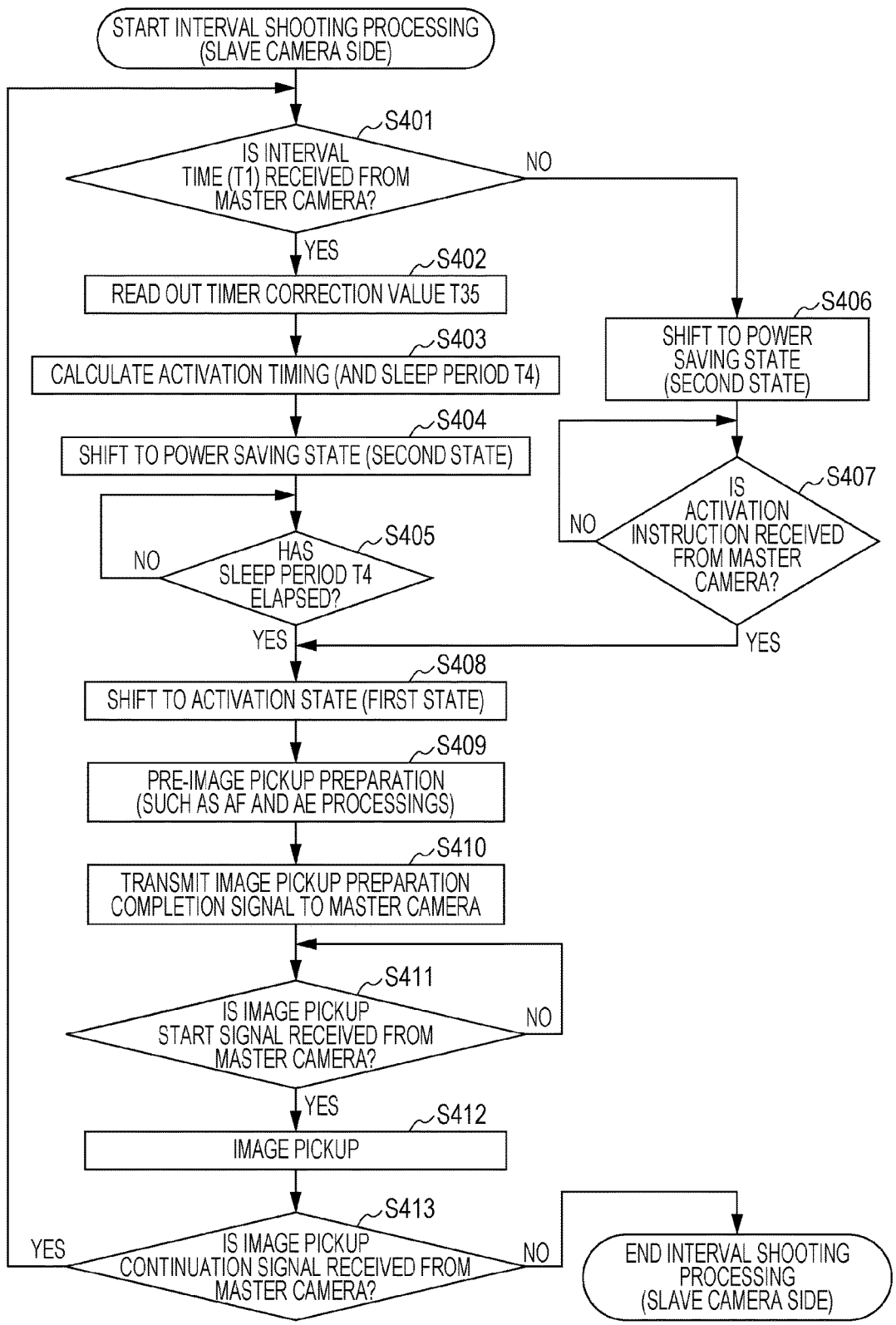
FIG. 8 is a flow chart for describing the interval shooting processing in the digital camera on a slave camera side which functions as an electronic device according to the second embodiment for carrying out the present invention.

Hereinafter, the interval shooting processing in the slave camera according to the present embodiment will be described with reference to FIG. 8. FIG. 8 is a flow chart for describing the interval shooting processing in the camera 300 on the slave side which functions as the electronic device according to the second embodiment for carrying out the present invention. It is noted that this flow chart illustrates the processing after the first image pickup is completed by way of the above-described basic operations in the cameras 300 on both the master camera side and the slave camera side in the interval shooting mode.

When the first image pickup is ended in a state in which the interval shooting mode is set, in step S401, the CPU 311 determines whether or not the interval time T1 is received from the master camera. As described above, in a case where the slave camera is a model supporting the calculation related to the change of its own operation state, the interval time T1 is transmitted from the master camera to the slave camera. Therefore, by performing the determination in step S401, it is possible to determine whether or not the slave camera is a model supporting the calculation for its own activation timing (self-calculation).

In the determination in step S401, when it is determined that the interval time T1 is received, the flow proceeds to step S402, and when it is determined that the interval time T1 is not received, the flow proceeds to step S406. It is noted that, since processings in steps S406 and S407 are substantially the same as those in steps S207 and S208 according to the above-described first embodiment, descriptions thereof will be omitted.

In step S402, the CPU 311 reads out the previously stored timer correction time T35 from the memory 308. The above-described timer correction time T35 is specific correction information for correcting the errors of the mutual built-in timers 311a of the master camera and the slave camera. The present embodiment relates to the configuration in which the timer correction time T35 stored in the slave camera side is read out, but the configuration is not limited to this. For example, a configuration in which the slave camera receives the timer correction time T35 stored in the master camera side and the interval time T1 from the master camera at the same time may also be adopted.

Next, in step S403, the CPU (first timing calculation unit) 311 calculates the slave activation timing (first timing) for changing the operation state of the slave camera from the power saving state (second state) to the activation state (first state). It is noted that, since the calculation method for the slave activation timing is substantially the same as the calculation method for the flash activation timing according to the above-described first embodiment, descriptions thereof will be omitted.

In addition, the CPU 311 can also calculate the sleep period T4 during which the operation state of the slave camera is maintained at the second state by calculating the slave activation timing. This detail will be described with reference to FIGS. 9A and 9B. FIGS. 9A and 9B are timing charts related to the operations of the cameras 300 functioning as the image pickup apparatus according to the second embodiment for carrying out the present invention, and FIG. 9A is the timing chart related to the operation of the master camera according to the present embodiment. FIG. 9B is the timing chart related to the operation of the slave camera according to the present embodiment. It is noted that, with regard to the operation timing of the master camera, since the operation is performed at a timing substantially similar to that for the camera 100 according to the above-described first embodiment, the same periods will be assigned with similar reference symbols, and descriptions thereof will be omitted.

In FIG. 9B, the period T33 indicates a period from the start of the image pickup of the subject until the change to the second state in the slave camera. The period T34 indicates a period from an ideal timing for activating the operation state of the slave camera until the completion of the pre-image pickup preparation. It is noted that the period T34 includes a standby time of the slave camera which is prepared because of the pre-image pickup time set by taking into account a temporal margin. A period T35 indicates a period corrected by the timer correction time T35 described above.

According to the present embodiment, the slave activation timing (first timing) is set by the CPU 311 while a temporal margin is prepared by taking the errors of the built-in timers of the master camera and the slave camera into account.

Specifically, the CPU (first timing calculation unit) 311 sets (calculates) an activation timing of the slave camera such that its activation is realized earlier than the activation timing of the master camera by the timer correction time T35. That is, the sleep period T2 of the master camera is set to be longer than the sleep period T4 of the slave camera.

With reference to FIG. 8 again, since processings in steps S404 to S408 are substantially the same as those in steps S205 to S209 according to the above-described first embodiment, descriptions thereof will be omitted. In step S409, the CPU 311 performs the pre-image pickup preparation for picking up the image of the subject. It is noted that, since the pre-image pickup preparation in the slave camera is similar to the above-described pre-image pickup preparation in the master camera, descriptions thereof will be omitted.

Next, in step S410, the CPU 311 transmits the signal (image pickup preparation completion signal) indicating the completion of the pre-image pickup preparation to the CPU 311 of the master camera. Subsequently, in step S411, the CPU 311 determines whether or not the image pickup start signal is transmitted from the master camera side. That is, the CPU 311 of the slave camera determines whether or not the interval time T1 measured by the master camera has elapsed. In step S411, in a case where the image pickup start signal is received, the flow proceeds to step S412, and in a case where the image pickup start signal is not received, the processing in step S411 is repeated.

Next, in step S412, the CPU 311 causes the image pickup element 105 to pick up the image of the subject, and the image data obtained by this image pickup is recorded in the memory 308 and the recording medium 310. Since processing in step S413 is substantially similar to that in step S214 according to the above-described first embodiment, descriptions thereof will be omitted.

Similarly as in the above-described first embodiment, also with regard to the camera 300 according to the present embodiment, a configuration in which the transmission and reception of the image pickup preparation completion signal, the image pickup start signal, the image pickup continuation signal, and the like on the master camera side and the slave camera side are not performed may also be adopted. That is, a configuration in which the processings in steps S316, S318, and S321 on the master camera side and the processings in steps S410, S411, and S413 on the slave camera side are omitted may be adopted. In this case, the communications performed between the master camera and the slave camera are only the transmission and reception of the interval time T1 and the timer correction time T35. With the adoption of this configuration, the camera 300 according to the present embodiment can suppress the power consumption used for the communication. The interval shooting processing in the slave camera has been described above.

As described above, with the camera 300 according to the present embodiment on the slave side, even in a case where the interval shooting mode is set, the CPU 311 of the slave camera can calculate its own slave activation timing. That is, the slave camera can calculate its own activation timing without receiving the activation instruction from the master camera. Subsequently, the CPU 311 of the slave camera can change the operation state of the slave camera from the power saving state to the activation state on the basis of this slave activation timing.

With this configuration, the master camera according to the present embodiment does not need to transmit the activation instruction to the slave camera. Therefore, the CPU 311 of the master camera can change the operation state of the master camera from the power saving state to the activation state on the basis of the time used for its own image pickup preparation. That is, even in a case where the master camera and the slave camera are set in the interval shooting mode, it is possible to suppress the power consumption on the master camera side. Therefore, with the camera 300 according to the present embodiment, even in a case where the image of the subject is picked up at the set time, it is possible to suppress the power consumption of the camera 300.

The present embodiment relates to the configuration for picking up the images of the subject while both the master camera and the slave camera are in synchronism with each other, but the configuration is not limited to this. For example, a configuration in which the image pickup of the subject is performed at mutually different timings by the master camera and the slave camera may also be adopted.

In addition, the present embodiment relates to the configuration in which the single slave camera is connected to the master camera, a configuration in which two or more slave cameras are connected to the master camera may also be adopted.

Furthermore, the present embodiment relates to the configuration in which the master camera and the slave camera are substantially the same digital cameras, but the master camera and the slave camera may have different internal configurations. It is sufficient at least if the master camera and the slave camera have a configuration substantially equivalent to the CPU 311, the wireless communication unit 318, and the wireless antenna 319. For example, at least one of the master camera and the slave camera may be a device having a camera function such as a digital video camera or a smart phone.

The present embodiment also relates to the configuration in which the master camera and the slave camera are connected to each other via a wireless communication, but the configuration is not limited to this. For example, a configuration in which a wired communication circuit is provided to the camera 300, and the master camera and the slave camera are connected to each other by using an external cable may also be adopted.

The present embodiment also relates to the configuration in which the timer correction time T35 previously recorded in the slave camera is used, but the configuration is not limited to this. A configuration in which a correction value equivalent to the timer correction time T35 stored on the master camera side is transmitted to the slave camera, and the activation timing of the slave camera or the like is set by using this correction value may also be adopted.

Although the present embodiment does not relate to the configuration in which the timer offset information Toffset is obtained like the above-described first embodiment, the configuration is not limited to this. For example, a configuration in which the activation timing of the slave camera is set on the basis of the timer offset information Toffset calculated on the basis of the timer accuracies of the built-in timers of the master camera and the slave camera may also be adopted. In particular, in a case where types of the image pickup apparatus are different in the master camera and the slave camera (for example, a case where one of the cameras is a smart phone or the like), the timer offset information Toffset is preferably calculated similarly as in the above-described first embodiment. In addition, a configuration for correcting the activation timing of the slave camera on the basis of the timer offset information Toffset is preferably adopted.

The present embodiment also relates to the configuration in which the wireless communication unit 318 and the wireless antenna 319 are provided within the camera 300, but a configuration in which a transmitter that is externally attachable to the camera 300 for the wireless communication is attached to the camera 300 may also be adopted.

The embodiments of the present invention have been described above, but the present invention is not limited to these embodiments, and various modifications and alterations can be made within the gist of the present invention. For example, the above-described embodiments relate to the configuration in which its own activation timing (first timing) is calculated on the electronic device side such as the flash 200 or the slave camera, but the configuration is not limited to this.

For example, a configuration in which the activation timing of the electronic device is calculated by the camera 100 or calculated on the master camera side, and information related to this calculated activation timing is transmitted to the electronic device may also be adopted. In the case of this configuration, the built-in timer (measurement unit) in the electronic device measures the time until the start of the operation for changing the operation state of the electronic device on the basis of the information related to the activation timing which is received from the image pickup apparatus. Subsequently, the control unit of the electronic device starts the operation for changing the operation state of the electronic device from the power saving state (fourth state) to the activation state (third state) in accordance with the completion of the time measurement by this built-in timer. With this configuration too, similarly as in the above-described embodiments, the power consumption of the image pickup apparatus in a case where the interval shooting mode is set can be suppressed.

In addition, according to the above-described embodiments, the operations and processings related to the image pickup apparatus and the electronic device in a case where the interval shooting mode is set have been described, but the configuration is not limited to this. For example, even in a case where a shooting mode (so-called self-timer shooting mode) in which the image of the subject is picked up at a time set by the user is set as the shooting mode for the image pickup apparatus and the electronic device, the present invention is effective.

In addition, the above-described embodiments relate to the configuration in which the interval time T1 corresponding to the information related to the timing for picking up the image of the subject or the like is transmitted from the image pickup apparatus to the electronic device for every image pickup in the interval shooting mode, but the configuration is not limited to this. For example, a configuration in which the above-described information related to the timing for picking up the image of the subject or the like is transmitted from the image pickup apparatus to the electronic device only in the first image pickup after the start of the interval shooting may also be adopted. In this case, a configuration is preferably adopted in which the communication between the image pickup apparatus and the electronic device is resumed in accordance with a situation where the change of the shooting mode or the cancellation of the interval shooting is instructed by the user. With this configuration, it is possible to further suppress the power consumptions of the image pickup apparatus and the electronic device.

In addition, the above-described embodiments relate to the configuration in which the processing units or the control units provided within the digital camera and the flash control the operations of the digital camera and the flash, but the configuration is not limited to this. A configuration in which a program following the above-described flows of FIGS. 3A and 3B, FIG. 5, FIGS. 7A and 7B, and FIG. 8 is previously stored in a memory, and a predetermined control unit or a CPU executes this program to control the operations of the digital camera and the flash may also be adopted.

According to the above-described first embodiment, the system in which the CPU 111 of the camera 100 and the flash control unit 202 of the flash 200 independently execute the respective operations is constituted, but the configuration is not limited to this. For example, a camera system configured to execute the respective operations of the camera 100 and the flash 200 in an overall manner may of course be adopted. In this case, a camera system configured to execute the processings obtained by combining the flow charts of FIGS. 3A and 3B and FIG. 5 while the respective units of the camera 100 and the flash 200 operate in collaboration with each other is preferably used. It is noted that, similarly also with regard to the master camera and the slave camera according to the above-described second embodiment, a camera system configured to execute the processings obtained by combining the flows of FIGS. 7A and 7B and FIG. 8 with each other may of course be adopted.

Any mode of the program such as an object code, a program executed by an interpreter, or a script data supplied to an operating system may be adopted as long as the function of the program is realized. For example, a magnetic recording medium such as a hard disc drive or a magnetic tape or an optical/opto-magnetic recording medium may be used as a recording medium that supplies the program.

According to the above-described embodiments, the case where the flash 200 functioning as an accessory device or the slave camera (the camera 300) is adopted as an example of the electronic device that can communicate with the digital camera has been described, but the configuration is not limited to this. For example, the present invention can be applied to various electronic devices such as a positioning apparatus such as a global positioning system (GPS) unit, an electronic viewfinder, an external microphone, a laptop PC, and a smart phone within the gist of the present invention.

In addition, according to the above-described embodiments, the case where the digital camera is adopted as an example of the image pickup apparatus that carries out the present invention has been described, but the configuration is not limited to this. For example, the present invention can be applied to various image pickup apparatuses including portable devices such as a digital video camera and a smart phone within the gist of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2014-061487 filed Mar. 25, 2014, which is hereby incorporated by reference herein in its entirety.

What is claimed is:

1. An electronic device comprising:
   at least one processor; and
   at least one memory having stored thereon instructions that when executed by the at least one processor cause the at least one processor to function as:
   a communication unit that can communicate with an image pickup apparatus;
   a state change unit that can change an operation state of the electronic device to a first state in which an operation corresponding to an image pickup of a subject by the image pickup apparatus can be performed and a second state in which power consumption is lower than power consumption in the first state; and
   a timing calculation unit that calculates an activation timing for starting an operation for changing the operation state of the electronic device from the second state to the first state by the state change unit,
   wherein the timing calculation unit calculates the activation timing on the basis of information related to a timing for picking up the image of the subject by the image pickup apparatus which is received from the image pickup apparatus via the communication unit,
   wherein the activation timing calculated by the timing calculation unit is different depending on whether the information related to the timing for picking up the image of the subject is first information or second information that is different from the first information,
   wherein the state change unit starts the operation for changing the operation state of the electronic device from the first state to the second state after the activation timing is calculated by the timing calculation unit, and
   wherein the state change unit starts the operation for changing the operation state of the electronic device from the second state to the first state at the activation timing.

2. The electronic device according to claim 1,
   wherein the timing calculation unit does not calculate the activation timing in a case where the information related to the timing for picking up the image of the subject by the image pickup apparatus is not received from the image pickup apparatus via the communication unit, and
   wherein the state change unit starts the operation for changing the operation state of the electronic device from the second state to the first state in response to a reception of a signal for instructing the electronic device to start the operation for changing the operation state of the electronic device from the second state to the first state via the communication unit in a case where the information related to the timing for picking up the image of the subject by the image pickup apparatus is not received from the image pickup apparatus via the communication unit.

3. The electronic device according to claim 1, wherein execution of the instructions by the at least one processor causes the at least one processor to further function as:
a mode setting unit that can set a first mode for performing an operation corresponding to the image pickup of the subject continuously performed by the image pickup apparatus at a set time interval and a second mode for performing an operation corresponding to the image pickup of the subject performed once by the image pickup apparatus,
wherein the state change unit starts the operation for changing the operation state of the electronic device from the first state to the second state after the activation timing is calculated by the timing calculation unit in a case where the first mode is set by the mode setting unit, and
wherein the state change unit starts the operation for changing the operation state of the electronic device from the second state to the first state at the activation timing in a case where the first mode is set by the mode setting unit.

4. The electronic device according to claim 3,
wherein the timing calculation unit calculates the activation timing on the basis of the information related to the timing for picking up the image of the subject which is received from the image pickup apparatus in a case where the first mode is set by the mode setting unit, and
wherein the information related to the timing for picking up the image of the subject includes information related to the set time interval.

5. The electronic device according to claim 4, wherein execution of the instructions by the at least one processor causes the at least one processor to further function as:
a first measurement unit that measures a time related to the operation of the electronic device with a first measurement accuracy,
wherein the timing calculation unit calculates the activation timing on the basis of offset information based on the first measurement accuracy and a second measurement accuracy of a second measurement unit provided to the image pickup apparatus and the information related to the timing for picking up the image of the subject in a case where the first mode is set by the mode setting unit,
wherein the offset information is information obtained by comparing the first measurement accuracy and the second measurement accuracy with each other by the image pickup apparatus, and
wherein the offset information and the information related to the timing for picking up the image of the subject are transmitted from the image pickup apparatus to the electronic device via the communication unit.

6. The electronic device according to claim 5,
wherein, in a case where specific correction information that is previously stored in the image pickup apparatus and is used for correcting errors of the first measurement unit and the second measurement unit is received, the timing calculation unit calculates the activation timing on the basis of the specific correction information and the information related to the set time interval.

7. The electronic device according to claim 6,
wherein the timing calculation unit calculates the activation timing in a manner that a time from when the operation state of the electronic device is changed from the first state to the second state until when the operation state of the electronic device is changed from the second state to the first state in a case where the specific correction information is received is set to be longer than the time in a case where the offset information is received.

8. The electronic device according to claim 1, further comprising:
a light emission apparatus that can emit light in synchronism with the image pickup of the subject by the image pickup apparatus;
a main capacitor that can accumulate electric charges for causing the light emission apparatus to emit light; and
a charge circuit that charges the main capacitor with the electric charges,
wherein the electronic device is a flash that can illuminate the subject with light, and
wherein the timing calculation unit sets the activation timing on the basis of the information related to the timing for picking up the image of the subject and information related to a charge time used for charging the main capacitor with the electric charges corresponding to a predetermined voltage.

9. The electronic device according to claim 1,
wherein the electronic device is a second image pickup apparatus that can pick up an image of a subject in synchronism with the image pickup of the subject by the image pickup apparatus.

10. An image pickup apparatus comprising:
an image pickup element that picks up an image of a subject;
at least one processor; and
at least one memory having stored thereon instructions that when executed by the at least one processor cause the at least one processor to function as:
a communication unit that can communicate with an electronic device that can change an operation state to an activation state and a power saving state in which power consumption is lower than power consumption in the activation state on the basis of information related to a timing for picking up the image of the subject; and
a state change unit that can change an operation state of the image pickup apparatus to a first state in which the image pickup of the subject can be performed and a second state in which power consumption is lower than power consumption in the first state,
wherein the information related to the timing for picking up the image of the subject is transmitted to the electronic device via the communication unit,
wherein, in a case where the image pickup apparatus transmits the information related to a timing for picking up the image of the subject to the electronic device, the state change unit starts operation for changing the operation state of the image pickup apparatus from the first state to the second state after the information related to the timing for picking up the image of the subject is transmitted to the electronic device,
wherein, in a case where the image pickup apparatus transmits the information related to a timing for picking up the image of the subject to the electronic device, the state change unit starts the operation for changing the operation state of the image pickup apparatus from the second state to the first state on the basis of the information related to the timing for picking up the image of the subject, and wherein a time period from when the operation state of the image pickup apparatus is changed from the second state to the first state until when the image pickup apparatus starts capturing an image of the subject is longer in a case where the information related to the timing for picking up the image of the subject is transmitted to the electronic device than in a case where the information related to the timing for picking up the image of the subject is not transmitted to the electronic device.

11. The image pickup apparatus according to claim 10, wherein execution of the instructions by the at least one processor causes the at least one processor to further function as:

a mode setting unit that can set a first mode for continuously picking up the images of the subject at a set time interval and a second mode for picking up the image of the subject once in accordance with an operation of a user, wherein the state change unit starts the operation for changing the operation state of the image pickup apparatus from the first state to the second state after the information related to the timing for picking up the image of the subject is transmitted to the electronic device in a case where the first mode is set by the mode setting unit.

12. The image pickup apparatus according to claim 11, wherein execution of the instructions by the at least one processor causes the at least one processor to further function as:

a timing calculation unit that calculates an activation timing for starting the operation for changing the operation state of the image pickup apparatus from the second state to the first state by the state change unit, wherein the timing calculation unit calculates the activation timing after the information related to the timing for picking up the image of the subject is transmitted to the electronic device in a case where the first mode is set by the mode setting unit, wherein the information related to the timing for picking up the image of the subject is information related to the set time interval, and wherein the state change unit starts the operation for changing the operation state of the image pickup apparatus from the second state to the first state on the basis of the activation timing.

13. The image pickup apparatus according to claim 11, wherein execution of the instructions by the at least one processor causes the at least one processor to further function as:

a determination unit that determines whether or not the set time interval is longer than or equal to a predetermined time in a case where the first mode is set by the mode setting unit, wherein the state change unit changes the operation state of the image pickup apparatus from the first state to the second state in a case where the first mode is set by the mode setting unit and also the determination unit determines that the set time interval is longer than or equal to the predetermined time, and wherein the state change unit does not change the operation state of the image pickup apparatus from the first state to the second state during a period from a previous image pickup until a next image pickup in a case where the first mode is set by the mode setting unit and also the determination unit determines that the set time interval is shorter than the predetermined time.

14. A control method for an electronic device including at least one processor and at least one memory having stored thereon instructions that when executed by the at least one processor cause the at least one processor to function as a communication unit that can communicate with an image pickup apparatus, the control method comprising:

changing to allow an operation state of the electronic device to be a first state in which an operation corresponding to an image pickup of a subject by the image pickup apparatus is performed and a second state in which power consumption is lower than power consumption in the first state; and calculating an activation timing for staring the operation for changing the operation state of the electronic device from the second state to the first state in the changing, wherein the calculating includes calculating the activation timing on the basis of information related to a timing for picking up the image of the subject by the image pickup apparatus which is received from the image pickup apparatus via the communication unit, wherein the activation timing is different depending on whether the information related to the timing for picking up the image of the subject is first information or second information that is different from the first information, wherein the changing includes starting the operation for changing the operation state of the electronic device from the first state to the second state after the activation timing is calculated in the calculating, and wherein the changing includes starting the operation for changing the operation state of the electronic device from the second state to the first state at the activation timing.

15. A control method for an image pickup apparatus including an image pickup element that picks up an image of a subject, at least one processor, and at least one memory having stored thereon instructions that when executed by the at least one processor cause the at least one processor to function as a communication unit that can communicate with an electronic device that can change an operation state to an activation state and a power saving state in which power consumption is lower than power consumption in the activation state on the basis of information related to a timing for picking up the image of the subject, wherein an activation timing for starting the change of operation state is calculated to be different depending on whether the information related to the timing for picking up the image of the subject is first information or second information that is different from the first information, the control method comprising:

transmitting the information related to the timing for picking up the image of the subject to the electronic device via the communication unit; and changing an operation state of the image pickup apparatus to a first state in which the image pickup element can pick up the image of the subject and a second state in which power consumption is lower than power consumption in the first state, wherein the changing includes starting an operation for changing the operation state of the image pickup apparatus from the first state to the second state after the information related to the timing for picking up the image of the subject is transmitted to the electronic device, and wherein the changing includes starting the operation for changing the operation state of the image pickup apparatus from the second state to the first state on the basis of the information related to the timing for picking up the image of the subject.

16. A camera system comprising:
at least one processor;
at least one memory having stored thereon instructions executable by the at least one processor;
an image pickup apparatus; and
an electronic device that can communicate with the image pickup apparatus via a communication unit,
the image pickup apparatus including
an image pickup element, and
a first state change unit that can change an operation state of the image pickup apparatus to a first state in which an image pickup of a subject can be performed by the image pickup element and a second state in which power consumption is lower than power consumption in the first state, wherein the at least one processor executes the instructions to function as the first state change unit, and
the electronic device including
a second state change unit that can change the operation state of the electronic device to a third state in which an operation corresponding to the image pickup of the subject by the image pickup element can be performed and a fourth state in which power consumption is lower than power consumption in the third state, wherein the at least one processor executes the instructions to function as the second state change unit, and
a timing calculation unit that calculates an activation timing for starting an operation for changing the operation state of the electronic device from the fourth state to the third state by the second state change unit, wherein the at least one processor executes the instructions to function as the timing calculation unit,
wherein the image pickup apparatus transmits information related to a timing for picking up the image of the subject by the image pickup element to the electronic device via the communication unit,
wherein the first state change unit starts an operation for changing the operation state of the image pickup apparatus from the first state to the second state after the information related to the timing for picking up the image of the subject is transmitted to the electronic device,
wherein the timing calculation unit calculates the activation timing on the basis of the information related to the timing for picking up the image of the subject which is received from the image pickup apparatus,
wherein the second state change unit starts the operation for changing the operation state of the electronic device from the third state to the fourth state after the activation timing is calculated by the timing calculation unit,
wherein the second state change unit starts the operation for changing the operation state of the electronic device from the fourth state to the third state at the calculated activation timing, and
wherein the first state change unit starts the operation for changing the operation state of the image pickup apparatus from the second state to the first state on the basis of the information related to the timing for picking up the image of the subject.

17. The electronic device according to claim 1,
wherein the imaging apparatus is operable based on electrical power supplied from a power supply that is different from a power supply which supplies electrical power to the electronic device.

18. The electronic device according to claim 17,
wherein the imaging apparatus is configured to enable the electronic device to be attachable to and detachable from the imaging apparatus.

19. The electronic device according to claim 1,
wherein execution of the instructions by the at least one processor causes the at least one processor to further function as:
a mode setting unit that can set a first mode for performing an operation corresponding to the image pickup of the subject continuously performed by the image pickup apparatus at a set time interval and a second mode for performing an operation corresponding to the image pickup of the subject performed once by the image pickup apparatus,
wherein the first information includes offset information obtained on the basis of comparison between a measurement accuracy of a measurement unit provided in the image pickup apparatus and a measurement accuracy of a measurement unit provided in the electronic device,
wherein the second information includes specific correction information for correcting an error between the measurement accuracy of the measurement unit provided in the image pickup apparatus and the measurement accuracy of the measurement unit provided in the electronic device, and
wherein the timing calculation unit calculates the activation timing in a manner such that a time from when the operation state of the electronic device is changed from the first state to the second state until when the operation state of the electronic device is changed from the second state to the first state is longer in a case where the information related to the timing for picking up the image of the subject is the first information than in a case where the information related to the timing for picking up the image of the subject is the second information.

20. The image pickup apparatus according to claim 10,
wherein, in a case where the image pickup apparatus does not transmit the information related to the timing for picking up the image of the subject to the electronic device, the communication unit transmits, to the electronic device, a signal instructing the electronic device to start an operation of changing an operation state of the electronic device from the power saving state to the activation state, and
wherein, in a case where the image pickup apparatus does not transmit the information related to the timing for picking up the image of the subject to the electronic device, the state change unit starts the operation of changing the operation state of the image pickup apparatus from the second state to the first state before the communication unit transmits the signal to the electronic device.

21. The image pickup apparatus according to claim 10,
wherein, in a case where the electronic device is a device capable of calculating a timing for changing its own operation state, the communication unit transmits the timing for picking up the image of the subject to the electronic device, and wherein, in a case where the electronic device is a device incapable of calculating a timing for changing its own operation state, the communication unit does not transmit the timing for picking up the image of the subject to the electronic device.

\* \* \* \* \*